US012786743B2

(12) United States Patent
Esswie

(10) Patent No.: US 12,786,743 B2
(45) Date of Patent: Nov. 3, 2026

(54) ARTIFICIAL INTELLIGENCE MODEL DELIVERY VIA RADIO DATA PLANE

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 834 days.

(21) Appl. No.: 18/296,974

(22) Filed: Apr. 6, 2023

(65) Prior Publication Data

US 2024/0340659 A1 Oct. 10, 2024

(51) Int. Cl.
*H04W 24/02* (2009.01)
*H04W 24/08* (2009.01)
*H04W 76/10* (2018.01)

(52) U.S. Cl.
CPC ........... *H04W 24/02* (2013.01); *H04W 24/08* (2013.01); *H04W 76/10* (2018.02)

(58) Field of Classification Search
CPC ...... H04W 24/02; H04W 76/10; H04W 24/08
USPC .......................................................... 370/252
See application file for complete search history.

(56) References Cited

U.S. PATENT DOCUMENTS

2015/0139192 A1 5/2015 Zhang et al.
2017/0302421 A1 10/2017 Hsu et al.
2021/0168646 A1* 6/2021 Chen ..................... H04W 28/10
2023/0038071 A1* 2/2023 Shen ....................... G06N 3/098
2023/0328814 A1* 10/2023 Wang .................... H04W 28/02
370/328

FOREIGN PATENT DOCUMENTS

WO 2014/103098 7/2014
WO WO-2022015109 A1 * 1/2022 ............... H04L 1/02
(Continued)

OTHER PUBLICATIONS

Notification Concerning Transmittal of International Preliminary Report on Patentability or PCT Application No. PCT/US2023/036169 mailed Oct. 16, 2025, 12 pages.
(Continued)

*Primary Examiner* — Hermon Asres
(74) *Attorney, Agent, or Firm* — Amin, Turocy & Watson, LLP

(57) ABSTRACT

A radio access network node originates artificial intelligence model data to be transmitted to a user equipment. The node requests, from a core network entity, establishment of a data radio bearer to transmit the data to the user equipment bypassing a user plane function. The node receives a data radio bearer configuration and transmits the data via a data radio bearer configured according thereto without transmitting the data to the user plane function. The node may transmit, to the user plane function, a data volume report corresponding to the data that was transmitted to the user equipment but not transmitted to the user plane function. The node may forward to the user plane function a remaining portion of the data not transmitted to the user equipment due to a handover. The user plane function may forward the remaining data to a new serving node, which may transmit the remaining data.

20 Claims, 16 Drawing Sheets

(56) References Cited

FOREIGN PATENT DOCUMENTS

| | | |
|---|---|---|
| WO | 2022/205023 | 10/2022 |
| WO | 2023/040885 | 3/2023 |

OTHER PUBLICATIONS

European Office Action mailed Nov. 28, 2025 for European Patent Application No. 23822127.9, 3 pages.

Technical specifications (TS) 38.211—"5G; NR; Physical channels and modulation", 3GPP TS 38.211 version 16.2.0 Release 16, Jul. 2020, 136 pages.

Technical specifications (TS) 38.300—"5G; NR; NR and NG-RAN Overall description; Stage-2" 3GPP TS 38.300 version 16.4.0 Release 16, Jan. 2021, 151 pages.

Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

Technical specifications (TS) 38.331—"5G; NR; Radio Resource Control (RRC); Protocol specification", 3GPP TS 38.331 version 16.1.0 Release 16, Jul. 2020, 886 pages.

International Search Report and Written Opinion for PCT Application No. PCT/US2023/036169 mailed Feb. 1, 2024, 18 pages.

* cited by examiner

300A

300B

300C 510 515 520

| AI DRB ID | Device ID | AI data volume (Mbytes) |
| --- | --- | --- |
| DRB_1 | D_11 | X_11 |
| | D_21 | X_21 |
| ... | | |
| DRB_N | D_1N | X_1N |
| | D_2N | X_2N |

AI data volume information report

360

FIG. 5

ARTIFICIAL INTELLIGENCE MODEL DELIVERY VIA RADIO DATA PLANE

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, an example method comprises determining, by a radio access network node comprising a processor, artificial intelligence model information, or update artificial intelligence model information, to be transmitted to a user equipment. The method may further comprise transmitting, by the radio access network node to a control entity, for example a core network entity, a data radio bearer establishment request to request a data radio bearer that bypasses a user plane function in transmitting the artificial intelligence model information. The method may further comprise receiving, by the radio access network node from the control entity, a data radio bearer configuration, wherein the control entity transmitted the data radio bearer configuration to the radio access network node responsive to the data radio bearer establishment request. The method may further comprise transmitting, by the radio access network node to the user equipment via a data radio bearer established according to the data radio bearer configuration, the artificial intelligence model information, or the updated artificial intelligence model information, and transmitting, by the radio access network node to a user plane function, a data volume report corresponding to the artificial intelligence model information, or the updated artificial intelligence model information, that was transmitted to the user equipment but that was not transmitted to, through, via, by, or otherwise in conjunction with, the user plane function.

The data radio bearer configuration may comprise at least one of: a quality-of-service indication indicative of a quality-of-service corresponding to the updated artificial intelligence model information, a data volume reporting periodicity indication indicative of a reporting periodicity according to which the radio access network node is to transmit the data volume report, or a data forwarding coverage transfer criterion to be used in determining, by the radio access network node, that the transmitting the updated artificial intelligence model information is to be transferred to another radio access network node other than the radio access network node, such as, for example, when handover of the user equipment is likely.

The data volume report may comprise at least one of: a data radio bearer identifier corresponding to the data radio bearer; or one or more user equipment identifiers corresponding to one or more user equipment, comprising the user equipment, to which the radio access network node transmitted the updated artificial intelligence model information.

In an embodiment, the data radio bearer may be established between the radio access network node and the user equipment. The transmission of data via the data radio bearer may transfer the data directly from the radio access network node to the user equipment without the data being first transmitted to, and received back from, the user plane function.

The control entity or the user plane function may be implemented by a computing component of a core network communicatively coupled to the radio access network node. The transmitting of the artificial intelligence model information, or the updated artificial intelligence model information, may be via a wireless link between the radio access network node and the user equipment.

The transmitting of the updated artificial intelligence model information may comprise transmitting at least one protocol data unit that comprises the updated artificial intelligence model information, and wherein the transmitting of the updated artificial intelligence model information excludes transmitting, to the user plane function, the at least one protocol data unit that may comprise the updated artificial intelligence model information. A protocol data unit may be a packet, a segment, a datagram, or the like.

The data volume report may comprise a volume indication indicative of a number of units of the at least one protocol data unit that comprises the updated artificial intelligence model information. The data volume report may comprise a volume indication indicative of a size of the at least one protocol data unit that comprises the updated artificial intelligence model information. The data volume report may indicate a number of bytes, or a number of packets, segments, datagrams, etc. used to transmit the artificial intelligence model information, or updated artificial intelligence model information.

The example method may further comprise transmitting, by the radio access network node to the user equipment, a coverage request comprising a request for a signal strength corresponding to the radio access network node at the user equipment. The method may comprise receiving, by the radio access network node from the user equipment, a coverage indication indicative of a determined signal strength, corresponding to the radio access network node, determined by the user equipment. (It will be appreciated that a user equipment may determine and transmit a coverage indication indicative of a determined signal strength, corresponding to the radio access network node, without having received a coverage request from the radio access network node.) The method may further comprise analyzing, by the radio access network node, the determined signal strength with respect to a transfer criterion to result in an analyzed determined signal strength and determining, by the radio access network node, a remaining portion of the updated artificial intelligence model information that has not been transmitted to the user equipment to result in a determined unsent portion. Based on the analyzed determined signal strength being determined to satisfy the transfer criterion, the method may further comprise transmitting, by the radio access network node to the user plane function, the determined unsent portion. The determined unsent portion may be transmitted by the radio access network node to the user plane function via a backhaul communication link. Thus, the user plane function may be able to transfer the remaining, determined unsent portion of the artificial intelligence model information, or updated artificial intelligence model information, to a different radio access network node to facilitate the different radio access network node transmitting the remaining, determined unsent portion to the user equipment upon handover to the different radio access network node.

In an embodiment, the method may further comprise determining, by the radio access network node, a portion of the artificial intelligence model information, or the updated artificial intelligence model information, that has been transmitted to the user equipment by the radio access network node to result in a determined sent portion. The data volume report may comprise a volume indication indicative of a number of at least one protocol data unit, such as a packet, that comprises the determined sent portion.

The method may further comprise determining, by the radio access network node, a portion of the artificial intelligence model information, or the updated artificial intelligence model information, that has been transmitted to the user equipment by the radio access network node to result in a determined sent portion and the data volume report may comprise a volume indication indicative of one or more protocol data units that comprise the updated artificial intelligence model information.

In an embodiment, a radio access node may comprise a processor configured to determine data to be transmitted to a user equipment. The processor may be configured to transmit to a control entity a data radio bearer establishment request. Responsive to the data radio bearer establishment request, the processor may be further configured to receive from the control entity, a data radio bearer configuration. The processor may be further configured to transmit, to the user equipment via a data radio bearer established between the radio access network node and the user equipment according to the data radio bearer configuration, the data. The control entity may comprise at least one of a session management function or an access and mobility function.

The data radio bearer configuration may comprise a reporting periodicity indication indicative of a frequency at which the radio access node is to transmit to a user plane function a data volume report corresponding to transmission, by the radio access network node to the user equipment, of the data. The method may further comprise transmitting, by the radio access network node to the user plane function according to the reporting periodicity indication, a data volume report corresponding to the transmission of the data by the radio access network node to the user equipment.

The transmission of the data may comprise transmission of a protocol data unit that comprises the data, and the transmission of the data may exclude transmission, to the user plane function, of the protocol data unit that comprises the data.

The processor may be further configured to receive, from the user equipment, a coverage indication indicative of a determined signal strength corresponding to the radio access network node. The processor may be further configured to analyze the determined signal strength with respect to a transfer criterion, such as a signal strength threshold to result in an analyzed determined signal strength. The processor may be configured to determine a portion of the data that has not been transmitted to the user equipment to result in a determined unsent data portion, and based on the analyzed determined signal strength being determined to satisfy the transfer criterion, transmit, by the radio access network node to the user plane function, the determined unsent data portion.

In another embodiment, a non-transitory machine-readable medium may comprise executable instructions that, when executed by a processor of a radio access network node, facilitate performance of operations, comprising receiving, from a user equipment implementing a radio function according to an artificial intelligence model, radio performance metrics corresponding to the radio function. The operations may comprise, based on the radio performance metrics, determining updated artificial intelligence model information to be transmitted to the user equipment to be used by the user equipment to update the artificial intelligence model and establishing a data radio bearer between the radio access network node and the user equipment to be used to transmit the updated artificial intelligence model information to the user equipment The operations may comprise transmitting, to the user equipment via the data radio bearer, the updated artificial intelligence model information without transmitting the updated artificial intelligence model information to a user plane function and transmitting, by the radio access network node to the user plane function, a data volume report corresponding to the transmitting of the updated artificial intelligence model information to the user equipment.

The operations may further comprise determining an unsent portion of the updated artificial intelligence model information. The operations may further comprise receiving, from the user equipment, a coverage indication indicative of a determined signal strength corresponding to operation of the user equipment with respect to the radio access network node and analyzing the determined signal strength with respect to a transfer criterion to result in an analyzed determined signal strength. Based on the analyzed determined signal strength being determined to satisfy the transfer criterion, the operations may further comprise transmitting, to the user plane function, the unsent portion of the updated artificial intelligence model information to be transmitted to another radio access node which may then transmit the unsent portion of the updated artificial intelligence model information to the user equipment.

BRIEF DESCRIPTION OF THE DRAWINGS

FIG. 5 illustrates an example artificial intelligence machine learning model data volume information report transmitted from a radio access network node to a user plane function.

DETAILED DESCRIPTION OF THE DRAWINGS

Figure 1:
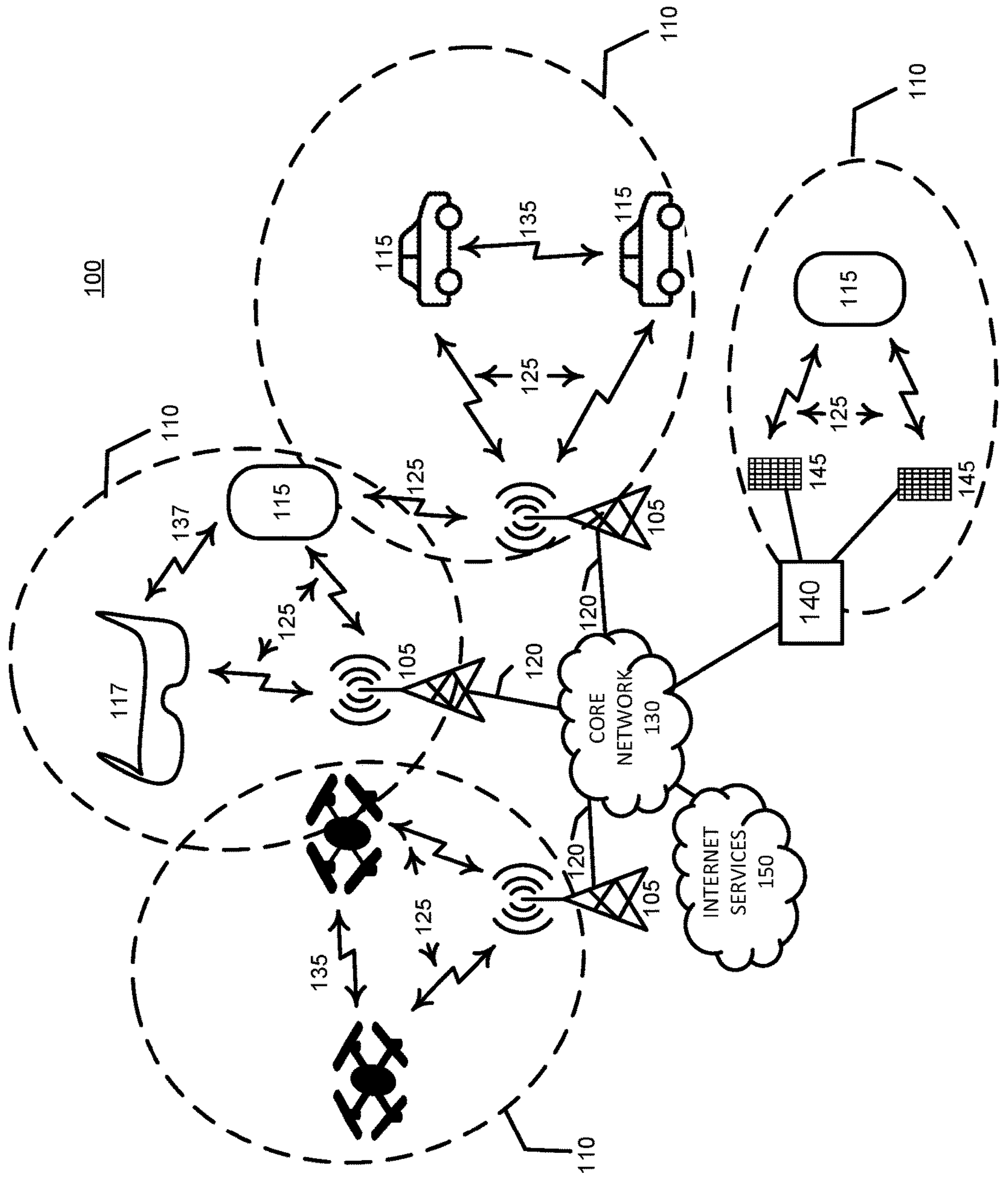
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning models ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions As disclosed herein, several embodiments facilitate dynamic management and updating of various AI/ML models deployed at different user equipment devices. A network RAN can dynamically control activation, deactivation, triggering of model retraining (that may be radio-function-specific) or updating of a learning model depending on monitoring and analysis of defined real-time performance metrics corresponding to a learning model being executed at a user equipment. It will be appreciated that even though a learning model may be implementing a particular radio function, metrics that are monitored or analyzed may be learning model metrics, not necessarily radio function metrics (e.g., a mathematical/statistical metric not necessarily a radio function metric such as, for example, signal strength).

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE. LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1, 4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking. Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Conventional rules-based models may be implemented in user equipment to perform various radio frequency ("RF") functions or signal processing functions, such as, beamforming, channel estimation, demodulation, and decoding, and may be based on well-established system models. Such models may result in satisfactory performance as long as the models closely follow actual behavior of a radio network system in which the user equipment is/are operating. However, performance of conventional models may provide less than optimal performance. AI/ML-based models typically outperform their conventional counterparts; unlike conventional rules-based models, AI/ML-based models may be based on data rather than rules of a pre-determined conventional model. Thus, outputs, or outcomes, of conventional rules-based models may be deemed 'deterministic' because inputs are applied to static rules that result in a 'determined' output whereas outputs, or outcomes, of an AI/ML model may be viewed as probabilistic because, a learning model typically infers a probable output based on coefficients, factors, functions, or other variables that may have been arrived at based on previous inputs to the model.

Use of an AI/ML model may facilitate improved user equipment performance compared to use of a conventional rules-based model. Multiple AI/ML driven use cases may include: AI/ML channel state information ("CSI") acquisition/prediction, AI/ML radio positioning, and AI/ML beam management. Although an AI/ML-based model trained using data from actual, real-world operation, can potentially outperform a traditional rules-based model, a learning model may be less robust, and thus provide less desirable results, in situations where the radio system/environment may have undergone changes that may not have been experienced, or 'seen', during training of the learning model, and thus the learning model may infer less-than-undesirable outputs than a static rules-based model in such an situation that is 'unknown' to the learning model. This problematic situation may be caused by, for example, specific network/user equipment conditions or configurations, or by an architecture of an AI/ML learning model, or a combination thereof. Therefore, it is it is desirable to implement procedures such that a network RAN can update.

For an AI/ML learning model implementation of a radio function at a user equipment, the user equipment or gNB/RAN may predict modulation and coding schemes ("MCS"), and a given amount of channel state information reporting instants may be used therefor. A modulation and coding scheme may be referred to as a format. A format, or scheme, may be associated with a Quality-of-service. A channel condition or an interference condition that did not exist during training or a model may systematically result a less-than-optimum MCS selection, which accordingly may lead to violating minimum device performance targets.

Training of an AI/ML model at a radio access network node and transmitting of a model, or a trained/updated model, by the RAN to a user equipment is desirable due to better processing capability at a RAN that at a UE to train or otherwise revise a learning model. Thus, AI/ML model transfer and delivery from a RAN to a UE via a radio link is desirable to take advantage of AI/ML processing-heavy model training being performed by a RAN separately from a UE that is actively running such model for performing radio functions based on the AI/ML model's inference. For example, an AI/ML model may be trained at a RAN node and transferred, or delivered, as a ready-trained model, towards user equipment devices over a downlink radio interface for executing AI/ML-driven beam failure detection and recovery operations. An AI/ML model size can range from small (e.g., one Kilobyte or less) to large (e.g., hundreds of Megabytes or more) depending on model complexity and purpose.

An artificial intelligence machine learning model may be delivered to a user equipment via a data channel or data channel resource, which may be a scheduled data channel resource. Unlike AI/ML model transmission over control channels, transmitting the larger AI/ML model data can take advantage of dynamic flexibility associated with data channels, including dynamic Quality of service (QOS) adaptation and dynamic resource scheduling. However, conventional data plane (e.g., a network path that data traffic takes to reach a user equipment device) implementations require that data must always pass by, or through, a user plane function ("UPF") entity of a core network. Requiring data to pass by or through a UPF is done to facilitate core network and radio network QoS provisioning, subscription-dependent performance adaptation, and tracking of transmitted data volumes for various devices for customer billing purposes. Thus, conventional data plane operation requires data plane termination at a UPF and not at a RAN node. UPF termination of data plane operation does not present a problem with respect to conventional data plane data exchange (either in downlink or uplink directions) because, for example, for downlink data transmission data is either originated at an external server (outside a cellular core network) or at a network edge server; traffic from both of which normally is routed to a UPF as a waypoint along a traffic route to a RAN node for radio transmission to a user equipment.

However, with AI/ML model deployed from RAN nodes, AI/ML model data may originated by the RAN node itself. Thus, according to current data plane techniques, if AI/ML model data is transmitted over the data plane, the source RAN node (e.g., a RAN that originates or updates AI/ML model information, transmits the AI/ML model information, which may comprise a large amount, or volume, of data to a UPF entity via an N3 backhaul link, for example, and subsequently the UPF retransmits the large payload back to the source RAN node for radio transmission to a user equipment. With many AI-capable user equipment devices, with each potentially each demanding multiple model transfers for executing various radio functions, this back-and-forth 'ping-pong' exchange of model data may use a significant amount of backhaul link resources and may overwhelm interface links between a RAN node and a UPF, which may result in denial or rejection of data transfer or increased interfacing latencies corresponding to other non-AI data exchanges.

In some embodiments disclosed herein, a novel data plane implementation, specific to AI/ML model transfers or to other use cases in which data is originated at the RAN node itself, is terminated at the RAN node rather than at the UPF. For UPF QOS provisioning and data volume billing tracking, novel reporting embodiments disclosed herein facilitate RAN-to-UPF reporting signaling to facilitate UPF enforcement of QoS of AI model data traffic flows, transmitted for various devices on the radio interface, and correspondingly, to determine the transmitted AI data volume for each device without the ping-pong exchanging of large data amounts between a RAN node and a UPF. Embodiments disclosed herein may facilitate implementation-specific vendor-differentiation. Vendor-specific configurations may facilitate cross-vendor interoperability, (e.g., RAN node and UPF by different vendors).

Figure 2:
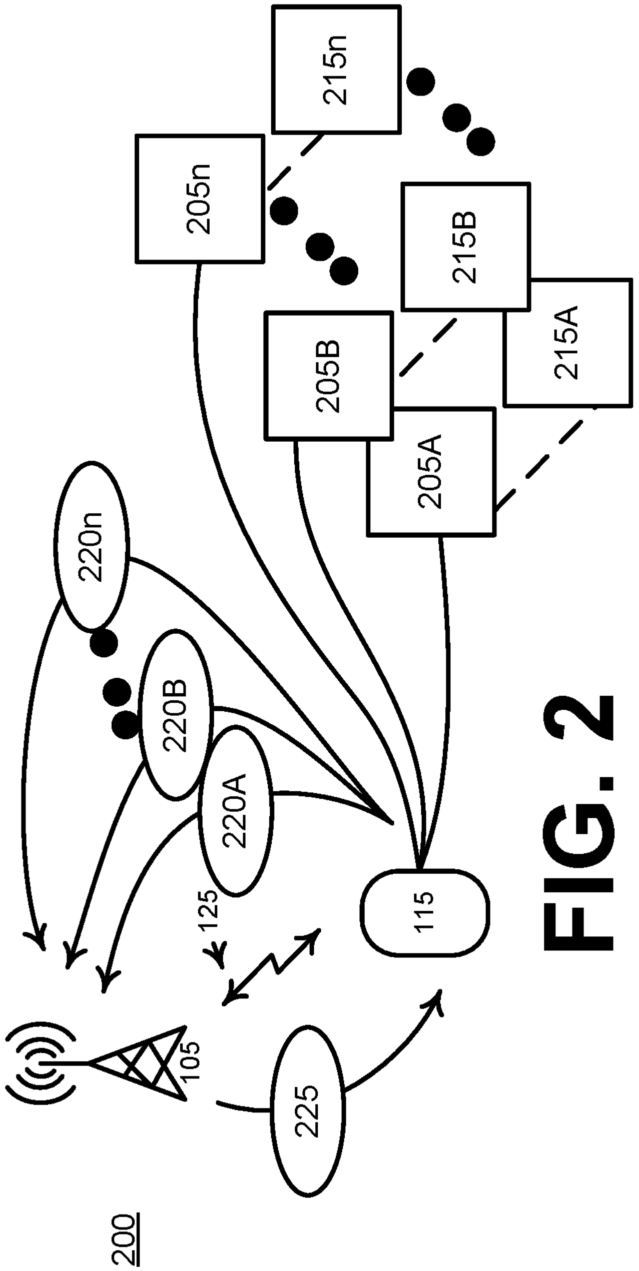
FIG. 2 illustrates an example environment with radio functions implemented in conjunction with corresponding learning models.

Turning now to FIG. 2, the figure illustrates a system 200 comprising a RAN node 105 in communication with a user equipment 115 via wireless link 125. UE 115 may perform various radio functions 205A-205*n* that may be facilitated by corresponding machine learning models 215A-215*n*, respectively. During UE 115 wireless operation and communication with RAN 105, the UE may transmit parameter metric reports 220A-220*n* that may comprise one or more learning model parameter metrics, corresponding to 215A-215*n*, respectively. Reports 220A-220*n* may comprise one or more control action requests, for example, requesting that one or more of models 215A-215*n* be deactivated, or retrained. RAN 105 may transmit to UE 115 learning model information 215 in one or more learning model information data messages 225.

AI/ML learning models, such as models 215 shown in FIG. 2 deployed at UE device 115, may be implementation-specific, (e.g., vendor proprietary learning models). (Examples of vendors that may provide proprietary learning models may comprise user equipment manufacturers or providers of applications for user equipment, network equipment providers or providers of applications for network equipment, or mobile network operators or providers of applications for mobile network operators.) The network RAN may determine overall performance of learning models deployed at a UE to facilitate minimum device performance requirements. User equipment devices may compile and report indications, which may be configured, or preconfigured, that reflect, or indicate, model performance of corresponding learning models.

A particular user equipment device may adopt several different AI/ML learning model implementations for running, performing, or otherwise facilitating different radio functions. Different learning model parameter metrics may be indicative of performance of different learning models. A user equipment may compile and report one or more different learning model performance-indicating parameter metrics, or indications, per each learning model. Different learning model metrics may be associated with different respective filtering or time resolution configurations. Thus, such customized metric reporting for a given learning model may facilitate optimized tracking and reporting for each active learning model of each user equipment device 115 that may be served by a RAN 105, as shown in FIG. 1 or FIG. 2. Accordingly, a network RAN 105 can obtain and use real-time performance of each learning model active at a UE 115 to facilitate optimum performance of the learning model and inferences it may generate. Furthermore, several reporting variants may be tailored to suit various AI/ML learning model implementations or purposes, for example, exact absolute, exact relative, quantized, or temporal (e.g., historical) metric reporting.

For AI/ML learning model performance, various parameters, and metrics corresponding thereto, may be considered, analyzed, or evaluated depending on the nature of the problem being solved and corresponding learning model functionality (for example, regression or classification), or radio function being performed or facilitated by a learning model. For example, for a radio function such as channel estimation or channel state information ("CSI") compression, a regression function may be used in a learning model with the following parameters, or metrics corresponding thereto, potentially being evaluated: Mean squared error ("MSE"); Root mean squared error ("RMSE"); Normalized mean squared error ("NMSE"); Mean absolute error ("MAE"); R-squared; Generalized cosine similarity ("GCS"); or Squared generalized cosine similarity ("SGCS"). Table 1 shows example functions defining corresponding learning model parameters, metrics corresponding to which may be monitored and evaluated as listed above.

TABLE 1

| Learning Model Parameter | Definition |
|---|---|
| Mean squared error | $\frac{1}{N}\sum_{i=1}^{N}(y_i - \hat{y}_i)^2$ |
| Root mean squared error | $\sqrt{\frac{1}{N}\sum_{i=1}^{N}(y_i - \hat{y}_i)^2}$ |
| Normalized mean squared error | $\frac{1}{N}\sum_{i=1}^{N}\frac{(y_i - \hat{y}_i)^2}{y_i^2}$ |
| Mean absolute error | $\frac{1}{N}\sum_{i=1}^{N}\lvert y_i - \hat{y}_i\rvert$ |
| R-squared | $1 - \frac{\sum_{i=1}^{N}(y_i - \hat{y}_i)^2}{\sum_{i=1}^{N}(y_i - \overline{y})^2}$ |
| Generalized cosine similarity | $\frac{1}{N}\sum_{i=1}^{N}\frac{\lvert y_i^H\hat{y}_i\rvert}{\lVert y_i\rVert\lVert\hat{y}_i\rVert}$ |
| Squared generalized cosine similarity | $\frac{1}{N}\sum_{i=1}^{N}\frac{\lvert y_i^H\hat{y}_i\rvert^2}{\lVert y_i\rVert^2\lVert\hat{y}_i\rVert^2}$ |

For a classification problem such as beam index prediction, an accuracy parameter metric can be analyzed to determine performance of a learning model that is facilitating beam index predictions. Other example learning model parameter metrics that may indicate performance of learning models resolving a classification problem, may include, but are not limited to: absolute numbers of true negatives, true positives, false negatives, and false positives; Precision and recall; or an F1 score. An F1-score may comprise an evaluation metric, that is used to express the performance of a machine learning model, or classifier and provides combined information about the precision and recall of the learning model. A high F1-score metric typically indicates a high value for both recall and precision metrics.

AI/ML learning model implementations at different devices may be vendor-proprietary as described above, and may be transparent to network nodes (e.g., a RAN serving a UE may not have access to specific functions and programming of a given learning model deployed in the UE that facilitates radio functions). To manage and facilitate a UE device in achieving performance targets, the RAN node may be made aware of the UE device's capability and an overall AI/ML learning model performance. Therefore, active UE devices, upon first connecting to a serving network RAN, may transmit device-specific AI/ML capability information including the following information elements ("IE"s): Type of AI/ML supported algorithms including supervised learning, unsupervised learning, and reinforcement learning; List of AI/ML supported radio functions; List of supported AI/ML model-specific metrics to estimate and report; Model bank size of each radio function, e.g., number of models that can be stored for each radio function; or Indication of model categorization (small/medium/large), which may facilitate the network RAN in defining, or determining, a dataset to be used by a learning model. For example, for a large number of neurons (e.g., nodes of a learning model neural network), determination of a commensurate number of information samples may be used to avoid overfitting by the learning model. AI/ML capability information elements can be part of device capability signaling based on the subsequent radio resource control ("RRC") signaling or based on a dynamically scheduled uplink control information ("UCI") transmission. Accordingly, a network RAN may determine updates to one or more learning models and may deliver the updated models, or coefficients corresponding thereto, to user equipment.

Dynamic AI/ML model delivery over data channel.

The term 'bearer' may refer to an Internet Protocol traffic flow, comprising one or more protocol data units, such as, for example, packets, corresponding to a Quality-of-Service. A bearer may comprise, or correspond to, a routing of packets to a user equipment. Existing data radio bearers ("DRB") are terminated at a user plane function ("UPF") (a core network entity), through which, or by which, all data must pass for communication to a user equipment. With embodiments disclosed herein, a novel DRB may be RAN-node-terminated to facilitate transferring and delivering AI/ML model information towards AI/ML capable UE devices without overwhelming backhaul links. Embodiments disclosed herein may comprise novel reporting and signaling via backhaul interfaces among RAN nodes and a UPF. The novel signaling and reporting may facilitate interoperability among RAN nodes and UPFs from different vendors while efficiently delivering AI/ML model payload over data channels.

Accordingly, unlike conventional network implementation in which a UPF becomes aware of data volume transmitted from a RAN to a UE because data must first be forwarded through the UPF itself, mandatory through-UPF data forwarding is eliminated, or minimized, for transport of RAN-originated data, such as AI/ML model information, to a user equipment. Such eliminating, or minimizing, of mandatory passing of AI/ML model information through a UPF may be desirable for AI/ML model data that is to be transmitted from a RAN to a UE and that has been generated, or updated, at the RAN. Instead of transmitting AI/ML generated at a RAN to a UPF and then back to the RAN for transmission to a UE to facilitate the UPF determining an amount of data being used to transmit the AI/ML information, novel routing and reporting techniques are disclosed herein. A dynamic reporting technique may indicate to a UPF an amount of data used to transmit AI/ML model information via a novel AI-specific DRB to facilitate making the UPF aware of the data volume, thus facilitating the UPF in performing billing functions corresponding to delivery of the AI/ML model from the RAN to the UE without the data used to transport the AI/ML model flowing to the UPF and then back to the RAN.

Figure 3A:
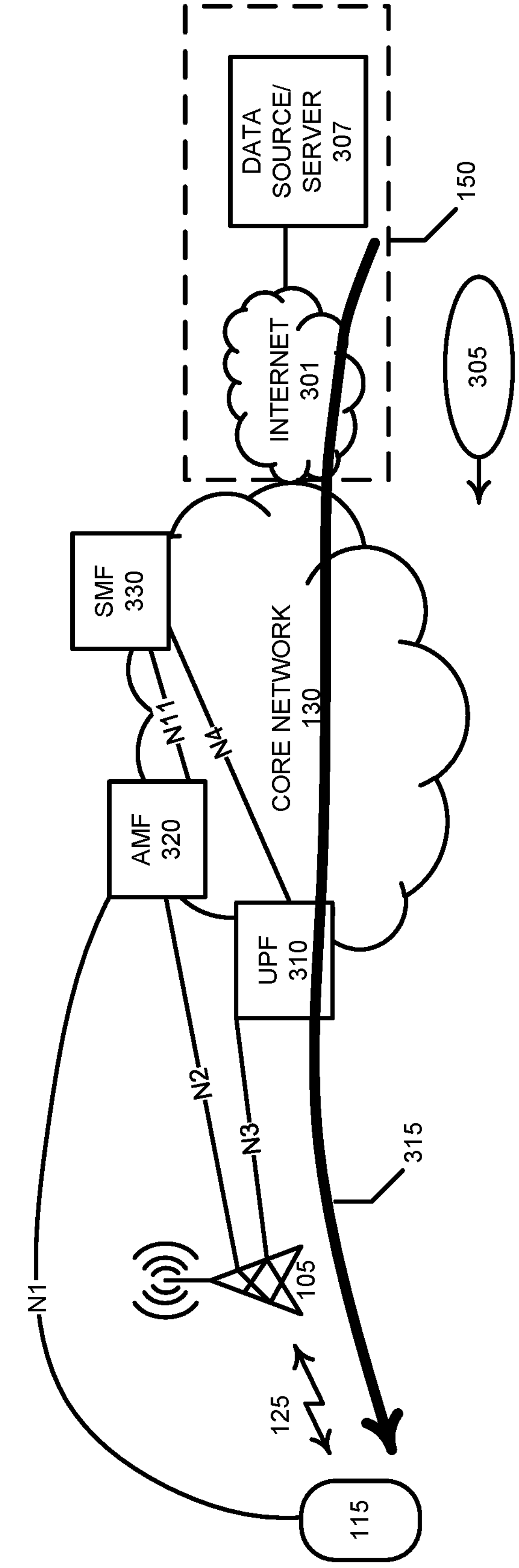
FIG. 3A illustrates a network environment with data directed to a user equipment passing through a user plane function.

Turning now to FIG. 3A, environment 300A illustrates data message 305 being transmitted from a data source 307, for example a web server, an enterprise server, and the like, to user equipment 115. Internet services 150 described in reference to FIG. 1 may comprise Internet 301 or data source 307. Continuing with description of FIG. 3A, data 305 may follow a path from server 307 via Internet 301 through core network 130 through user plane function 310 to RAN 105 via interface N3 and finally from RAN 105 to user equipment 115 via radio wireless communication link 125. The multi-entity, multi-link path from data source 307 to user equipment 115, although comprising multiple interfaces and links, is indicated in bold as a single flow path 315 to illustrates the movement of a data portion, such as a packet, used to transmit data from source 307 to UE 115.

Figure 3B:
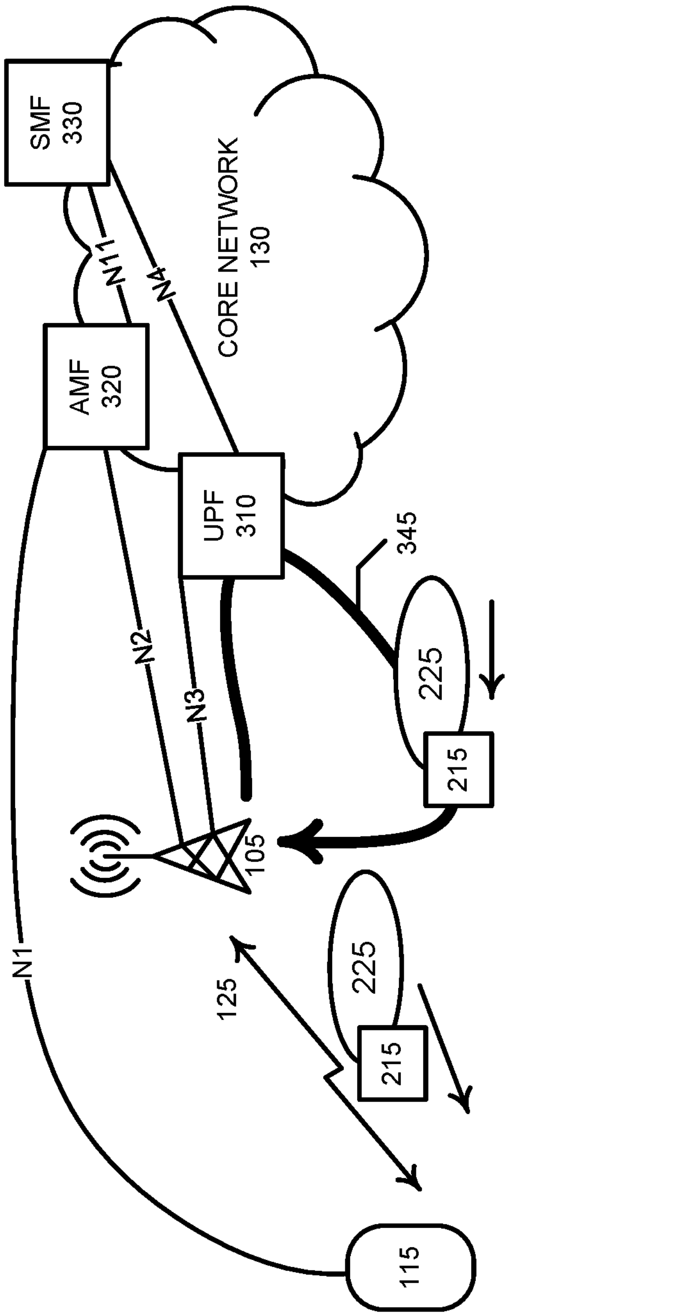
FIG. 3B illustrates a network environment with data transmitted from a radio access network node to user equipment passing through a user plane function.

Turning now to FIG. 3B, environment 300B illustrates a scenario where an artificial intelligence machine learning model 215 may be generated, or updated, at RAN node 105. The artificial intelligence machine learning model 215 may comprise information data 225 that may be transmitted to user plane function 310 via flow path 345, and back to RAN 105 where the artificial intelligence machine learning model data originated. Having traversed through user plane function 310 via path 345 back to RAN 105, data 225 comprising model 215 may be then transmitted from RAN 105 via radio wireless communication link 125 to user equipment 115. Thus, even though information data 225 to be transmitted to user equipment 115 was not received by RAN 105 via an entity of core network 130 but instead was generated by the RAN node itself, information data 225 generated at RAN 105 is nevertheless transmitted from RAN 105 to core network 130 (e.g., UPF 310) and back to RAN 105. Such transmitting of data 225 from RAN 105 to UPF 310 and back to RAN 105 before being transmitted to UE 115 may be referred to as 'ping-pong' communication since the same information sent from RAN 105 to UPF 310 is sent back to the RAN. Such ping-pong communication, as represented by bold path 345 in FIG. 3B, consumes resources of backhaul interface N3 and adds latency to the delivery of AI/ML model 215 from RAN 105 to UE 115.

Figure 3C:
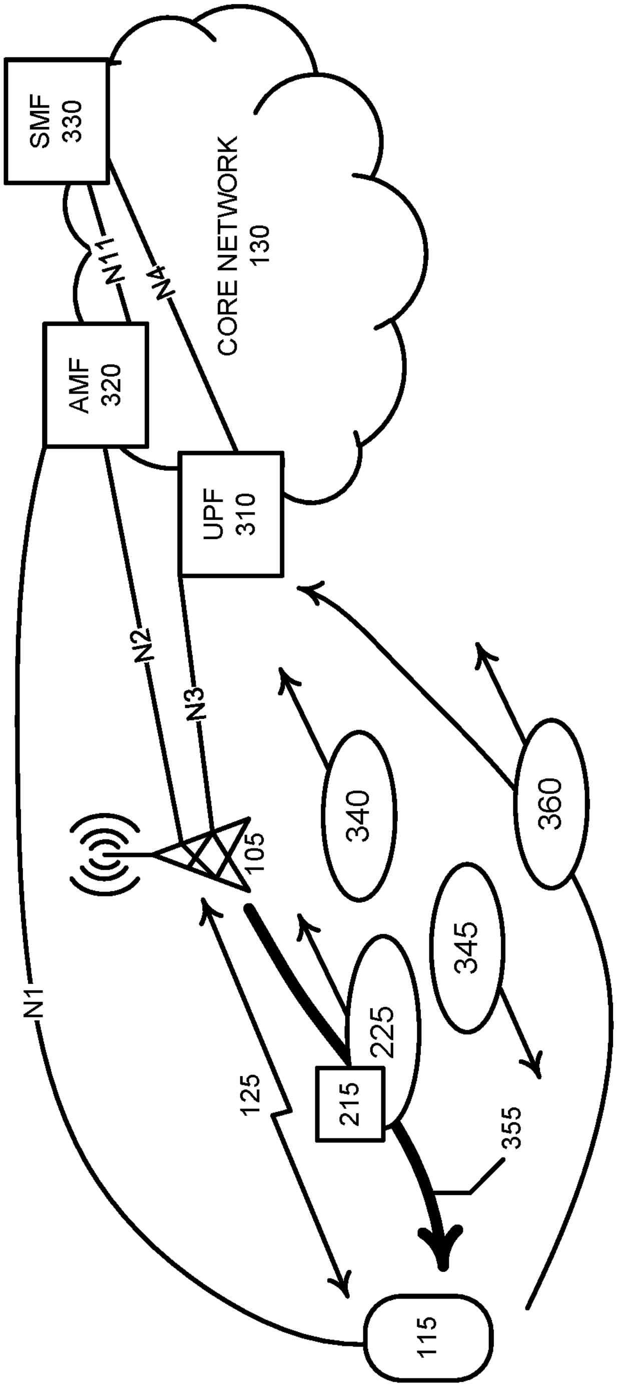
FIG. 3C illustrates a network environment with data transmitted from a radio access network node to user equipment without the data passing through a user plane function.

Tuning now to FIG. 3C, in environment 300C, RAN 105 can transmit AI/ML model information payload to a user equipment 115 via a radio interface link 125, without a preceding 'ping-pong' data exchange between the RAN and UPF 310 over backhaul links. RAN node 105 may transmit a novel data radio bearer ("DRB") establishment request 340, toward entities of core network 130 via backhaul links. A DRB request 340 may be transmitted to an Access and Mobility Function ("AMF") via an N2 interface, or to a Session Management Function ("SMF"), first to the AMF via the N2 interface and then from the AMF to the SMF via an N11 interface. DRB establishment request 340 may be indicative of RAN node 105 requesting that an entity of core network 130 establish a novel, on-demand, data plane for the purpose of delivery of AI/ML model information 225 from RAN 105 to UE 115 without protocol data units, such as, for example, packets, passing through UPF 310. Request 340 may facilitate core network 130 configuring RAN node 105 with QoS enforcement and data volume reporting instructions corresponding to novel AI/ML data radio bearer 355. A data volume report 360 may facilitate reporting to UPF 310 of volume information corresponding to payload traffic used to transfer AI/ML model 225 to user equipment 115. Thus, RAN node 105, upon availability of AI/ML model information (e.g., information corresponding to a new AI model or updated information corresponding to an AI model already used at UE 115) to be transferred to UE 115, may schedule and transmit the AI/ML model payload data over radio interface 125 via DRB 355 without ping-pong data exchange with UPF. The AI/ML model information may be transmitted from RAN 105 to UE 115 via AI-specific DRB 355 according to QoS targets associated with the DRB as configured by an entity of core network 130. As described in more detail in reference to FIG. 6, in case of UE 115 being handed over from RAN 105A to 105B while receiving a large AI/ML model, RAN node 105A may forward AI/ML information data that has not been transmitted by RAN 105A to, or received by, UE 115. Thus, UPF 310 may only be involved with handling of data packets used to transmit AI/ML information data 225 from RAN 105 to UE 115 when there is a handover event and without a direct connection (e.g., an IP connection) existing between source RAN 105A and destination RAN 105B. (For various reasons, a network operator may choose not to configure a direct connection between RAN 105A and RAN 105B; in which case the RANs would typically exchange control and data information through a core entity such as UPF 310.)

Furthermore, with RAN node 105 being configured to periodically report AI data volume as part of received AI-specific DRB configuration received from an entity of core network 130, RAN 105 may track and periodically report to UPF, the volume of AI/ML model information, transmitted via AI-specific DRB 355, for AI-capable UE 115. Such reporting facilitates UPF 310 maintaining accurate information regarding data amounts used by UE 115 for accounting or billing purposes—in case one or more AI/ML model data instances are directly transmitted over the radio interface without involvement of the UPF, report 360 may provide a reporting of a data amount, for example in terms of bytes, used to transfer AI/ML model information 225 from RAN 105 to UE 115 via AI-specific DRB 355. Accordingly, 'ping-pong' AI/ML model data exchange 345 among RAN node 105 and UPF 310, shown in FIG. 3B, may be avoided while still facilitating core network 130/UPF enforcement of QoS and billing tracking for AI data transmitted on the AI-specific, and RAN-node-terminated, DRB 355.

Figure 4:
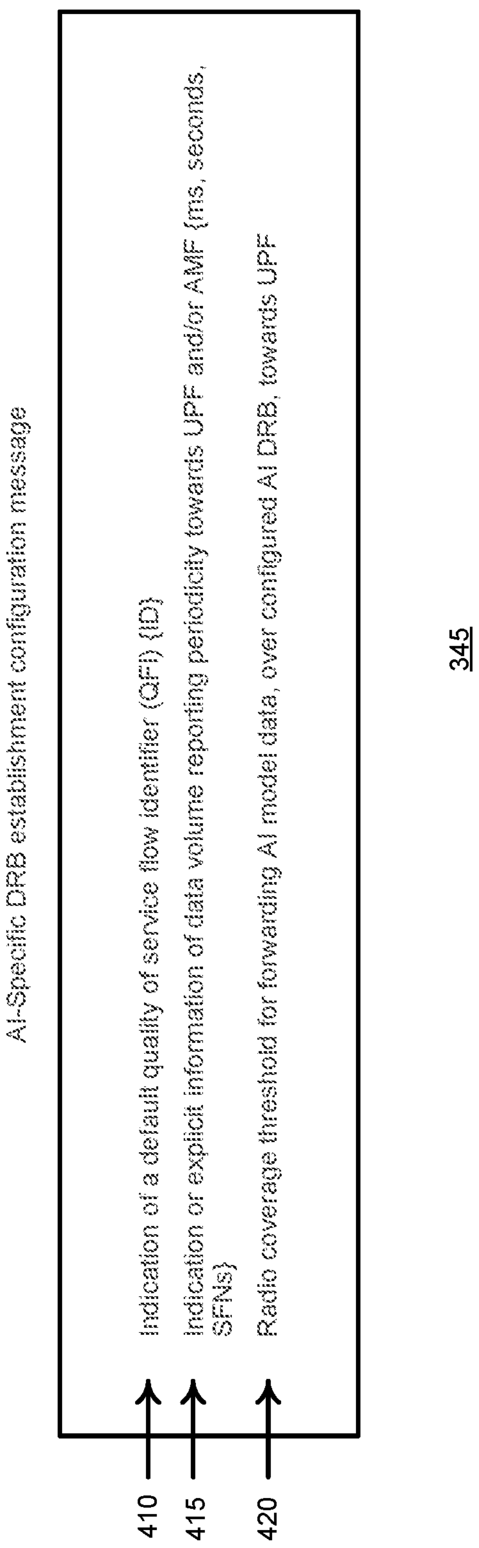
FIG. 4 illustrates an example artificial-intelligence-model-specific data radio bearer request.

As described in reference to FIG. 3C, RAN node 105 that is capable of AI/ML model training and direct, dynamic model delivery towards AI-capable UE 115 over data channels may transmit novel AI-specific data radio bearer request 340 towards either core network access and mobility function 320 or session management function 330 via backhaul links. Responsive to request 340, RAN node 105 may receive an AI-specific DRB configuration 345. As shown in FIG. 4, DRB configuration 345 may be transmitted from either AMF 320 or SMF 330 toward RAN node 105 via backhaul interfaces and links. AI-specific DRB configuration 345 may comprise a Quality-of-Service flow identifier ("QFI") 410. QFI 410 may be indicative of a QoS profile comprising indications of performance parameter targets via a radio interface, such as via a link 125 shown in FIG. 3C. Performance parameters indicated by AFI 410 shown in FIG. 4 may comprise latency, buffering delay, reliability levels, etc. that are to be associated with transmitting of AI/ML information traffic via AI-specific DRB 355 as shown in FIG. 3C. QFI 410 may facilitate core network 130 in semi-statically changing treatment of AI/ML model payload over core or radio interfaces (e.g., link 125). A QFI may refer to a numbering or sequencing indication corresponding to a flow. Thus, QFI associated with, for example, a certain packet, may be indicative of a flow that the packet corresponds to. A QCI may refer to a QoS profile (e.g., certain latency targets, certain allowable error targets, etc.) associated with a QFI.

Continuing with description of FIG. 4, configuration 365 may comprise an AI/ML data volume reporting periodicity indication 415. Periodicity indication 415 may be indicative of a periodicity according to which AI-capable RAN 105 shown in FIG. 3C should transmit an AI/ML data volume report 360 towards UPF 310. A data volume report 360 may comprise explicit reporting, wherein an exact size of AI/ML data volume transmitted to a user equipment is reported. In an embodiment, a data volume report may comprise an implicit indication of a volume of data transmitted, for example an index mapped to a certain predetermined range of transmitted AI data (e.g., an index '0' that may comprise fewer bits that an explicitly reported volume amount and that may indicate a transmitted data volume between, for example, 1 Megabyte and 5 Megabytes).

Continuing with description of FIG. 4, configuration 365 may comprise an AI/ML data forwarding coverage threshold 420. Data forwarding coverage threshold 420 may comprise a configured radio coverage threshold to be used to determine when to forward AI/ML data 225 to UPF 310 shown in FIG. 3C. Data coverage threshold 420 may be beneficial when a user equipment is located in a location experiencing poor RF conditions and may be likely to be involved in an inter-RAN-node handover during delivery of a large AI/ML model payload. Thus, on condition of violating the configured coverage threshold 420 corresponding to a UE device during AI/ML model transmission over an AI-specific DRB 355, RAN node 105 may forward the AI/ML model payload, or a portion thereof that has not been successfully transmitted to, or received by, the UE, to UPF 310. Thus, when a handover is invoked, UPF 310 may directly forward buffered AI/ML model payload towards the destination RAN node, which has become, or is becoming, the serving RAN for the user equipment. Such buffering 'ahead of time' based on a determination of handover of the user equipment being likely as a result of coverage threshold 420 being satisfied (e.g., a coverage level reported by the UE falls below threshold 420), delay in transmitting the large AI/ML model payload from the currently serving source RAN node to UPF may be reduced or eliminated since transfer of the AI/ML model information may have begun, or may have been completed, before the handover is invoked.

Turning now to FIG. 5, the figure illustrates an example AI/ML data volume information report 360 shown in FIG. 3C. An AI-capable RAN node 105 may transmit report 360 to UPF 310 for billing/data use tracking at the UPF. Returning to description of FIG. 5, report 360 may comprise one or more AI-specific DRB identifiers 510. Different AI-specific DRB identifiers 510 may be used to accommodate one or more AI-specific DRBs 355 (shown in FIG. 3C), configured and established for carrying AI/ML model payload towards AI capable devices, where different AI-specific DRBs may be used to facilitate different corresponding QFI profiles (e.g., different QFI profiles may be determined based on, for example, user equipment criticality or corresponding service subscription(s)).

For each DRB identifier 510, report 360 may comprise AI-capable device identifiers 515 corresponding to user equipment devices corresponding to DRBs 355 having respective DRB identifiers 510. Report 360 may comprise delivered AI/ML model data size indication 520 indicative of an amount, for example given in terms of Bytes, Megabytes, or Gigabytes, of data used to deliver AI/ML data via a DRB 355 corresponding to a respective DRB identifier 510. An AI/ML data size indicated by indication 520 may be determined by RAN 105, shown in FIG. 3C, to account for AI/ML model payload not forwarded to UPF 310, and may be indicative of a data amount of AI/ML model related traffic delivered to UE 115 without involvement of the UPF.

Figure 6:
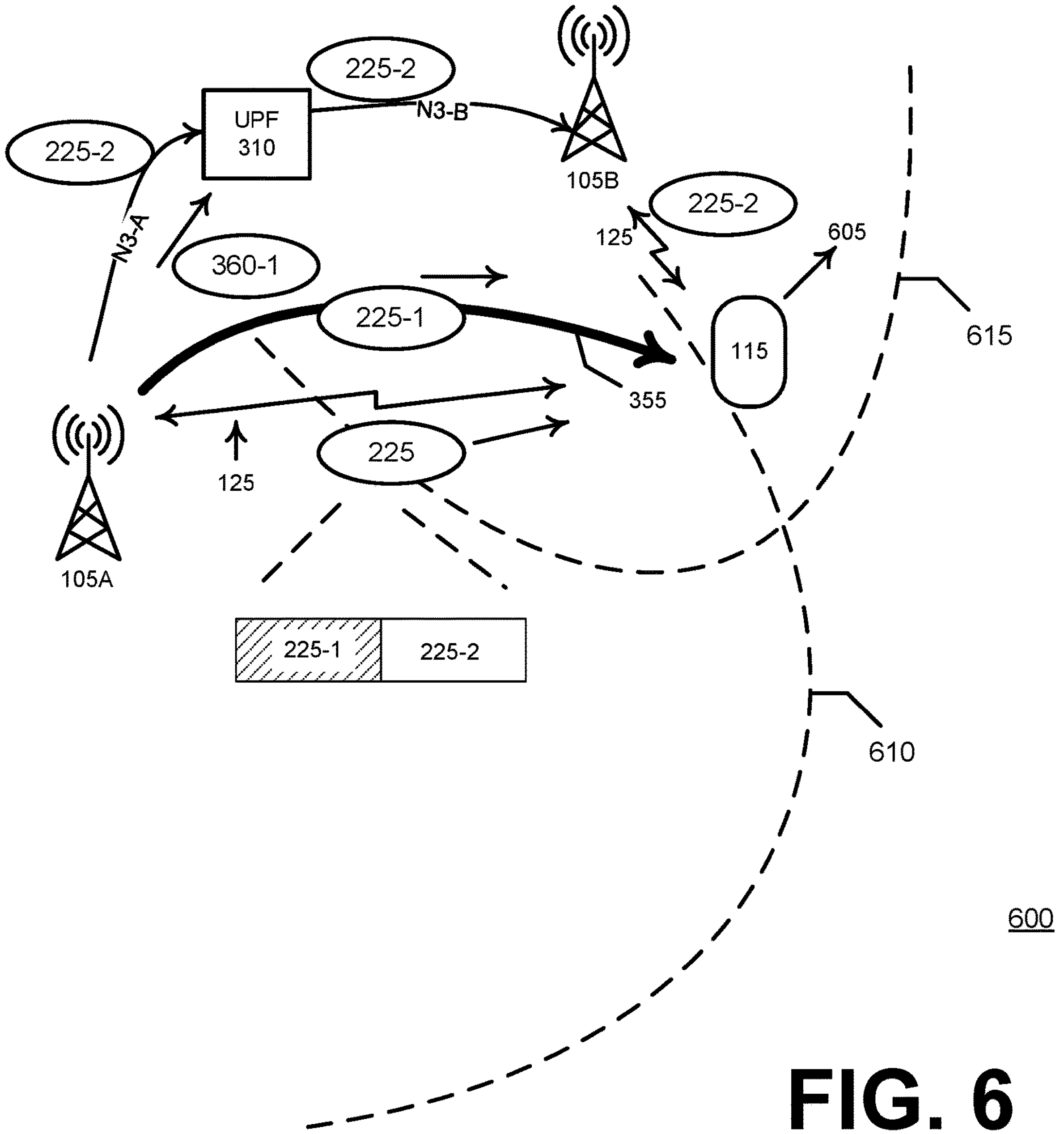
FIG. 6 illustrates an example environment with a user equipment receiving a learning model update while moving from coverage of one radio access network to another.

FIG. 6 illustrates an environment 600 in which UE 115 is moving in direction 605 beyond coverage area 610 corresponding to RAN 105A and into coverage area 615 corresponding to RAN 105B while receiving updated AI.ML information data 225. A first portion 225-1 of AI-ML model information 225, as indicated by the shaded block of AI/ML model information 225, has been delivered to UE 115 via data radio bearer 355 before the UE moved outside of coverage area 610. RAN 105A may transmit portion 225-2, which may not have been transmitted to, or received by UE 115, of AI/ML model information 225 to UPF 310. RAN 105A may transmit report 360-1 indicative of data corresponding to portion 225-1 having been transmitted to UE 115. Accordingly, UPF 310 may transmit to RAN 105B, via a backhaul link, remaining portion 225-2 of AI/ML model to RAN 105B. after UE 115 has been handed off from being served by RAN 105A to being served by RAN 105B, RAN 105B may then transmit, via a wireless radio link 125, portion 225-2 to UE 115, which is better served by RAN 105B than 105A (e.g., stronger signal received from RAN 105B than RAN 105A).

Figure 7:
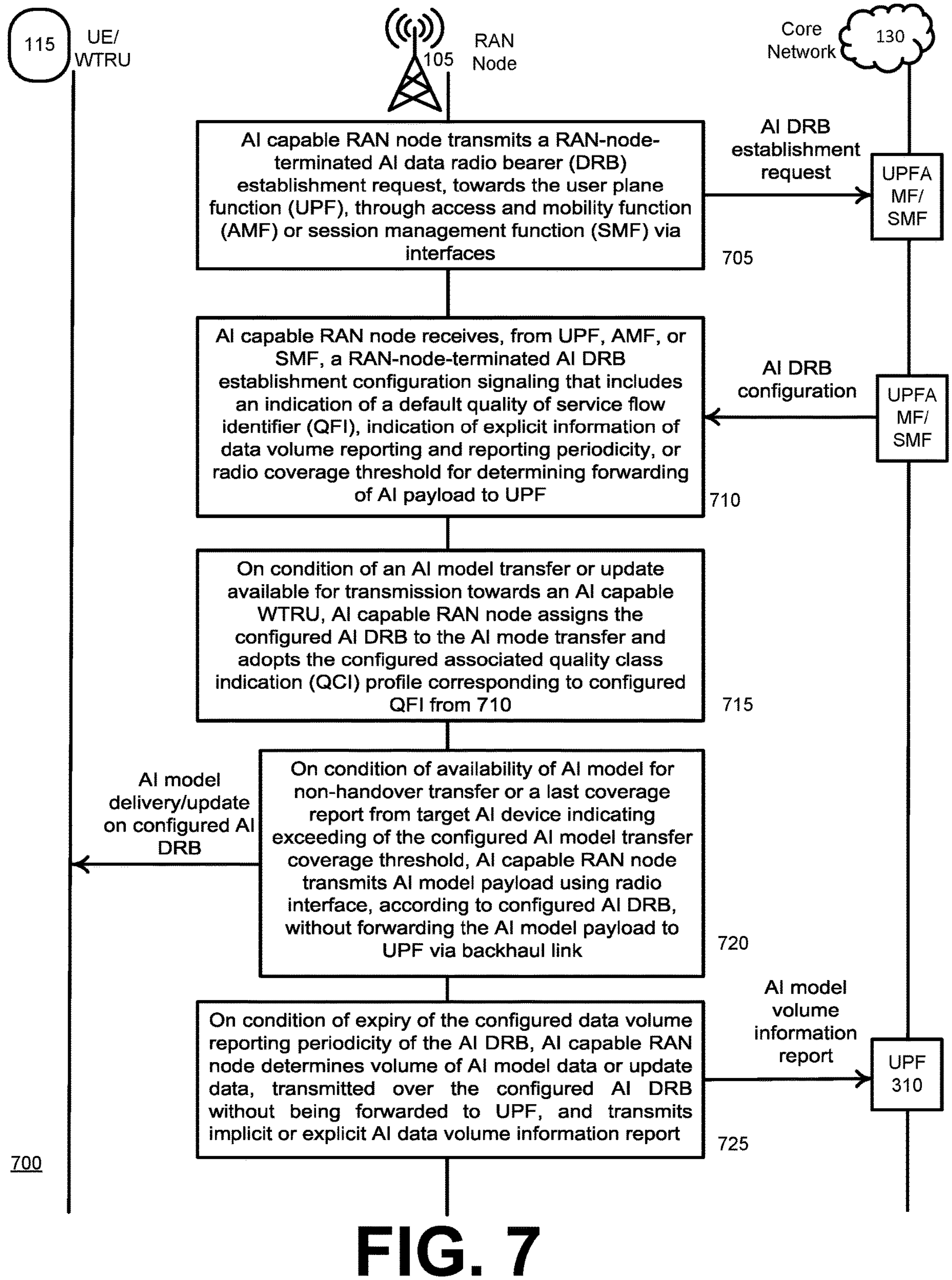
FIG. 7 illustrates a timing diagram of an example method to update, by a radio access network node, a learning model at a user equipment.

Turning now to FIG. 7, the figure illustrates a timing diagram of an example embodiment method 700. At act 705, AI-capable RAN node 105 transmits a RAN-node-terminated AI data radio bearer (DRB) establishment request, such as request 340 described in reference to FIG. 3C, towards a user plane function UPF. Request 340 may be transmitted through an access and mobility function and/or a session management function, over backhaul interfaces N2 or N3. At act 710, AI-capable RAN 105 may receive from a UPF, an AMF, or an SMF, a RAN-node-terminated AI DRB establishment configuration, such as configuration 345 described in reference to FIG. 3C. Configuration 345 may comprise an indication 410, as described in reference to FIG. 4, indicative of a default quality of service profile, an indication 415 of explicit information or data volume reporting periodicity for RAN 105 to generate and transmit a report to UPF and/or AMF a volume of traffic transmitted according to configuration 345, or a radio coverage criterion, such as a threshold 420, for determining if, or when, to forward AI payload data to the UPF.

At act 715, on condition of AI/ML model information being available for transfer to UE 115, which AI/ML model information may have been generated by, or originated by, RAN node 105, the RAN node may assign an AI/ML-specific DRB, such as DRB 355 described in reference to FIG. 3C, to AI model transfer, and may adopt a quality profile corresponding to a quality class indication (QCI) profile indication associated with the QFI received in the configuration at act 710.

RAN 105 may determine that AI/ML model data information is available for transfer to UE 115 without the UE being subject to handover to another RAN and that a last coverage report received from the UE indicates that signal-strength/coverage at the UE corresponding to RAN 105 indicates that the UE is not likely to be subject to handover during transfer of the RAN-originated AI/ML information. At act 720, RAN node 105 transmits the RAN-originated AI/ML model payload via a radio interface according to the AI DRB configured at act 715 according to configuration information received at act 710 without forwarding the AI/ML model payload to UPF 310 via backhaul links. RAN 105 may determine to transmit to UPF 310 a volume data reporting according to a periodicity, such as a periodicity indicated by indication 415 described in reference to FIG. 4 and may transmit a volume data report to the UPF at act 725.

Figure 8:
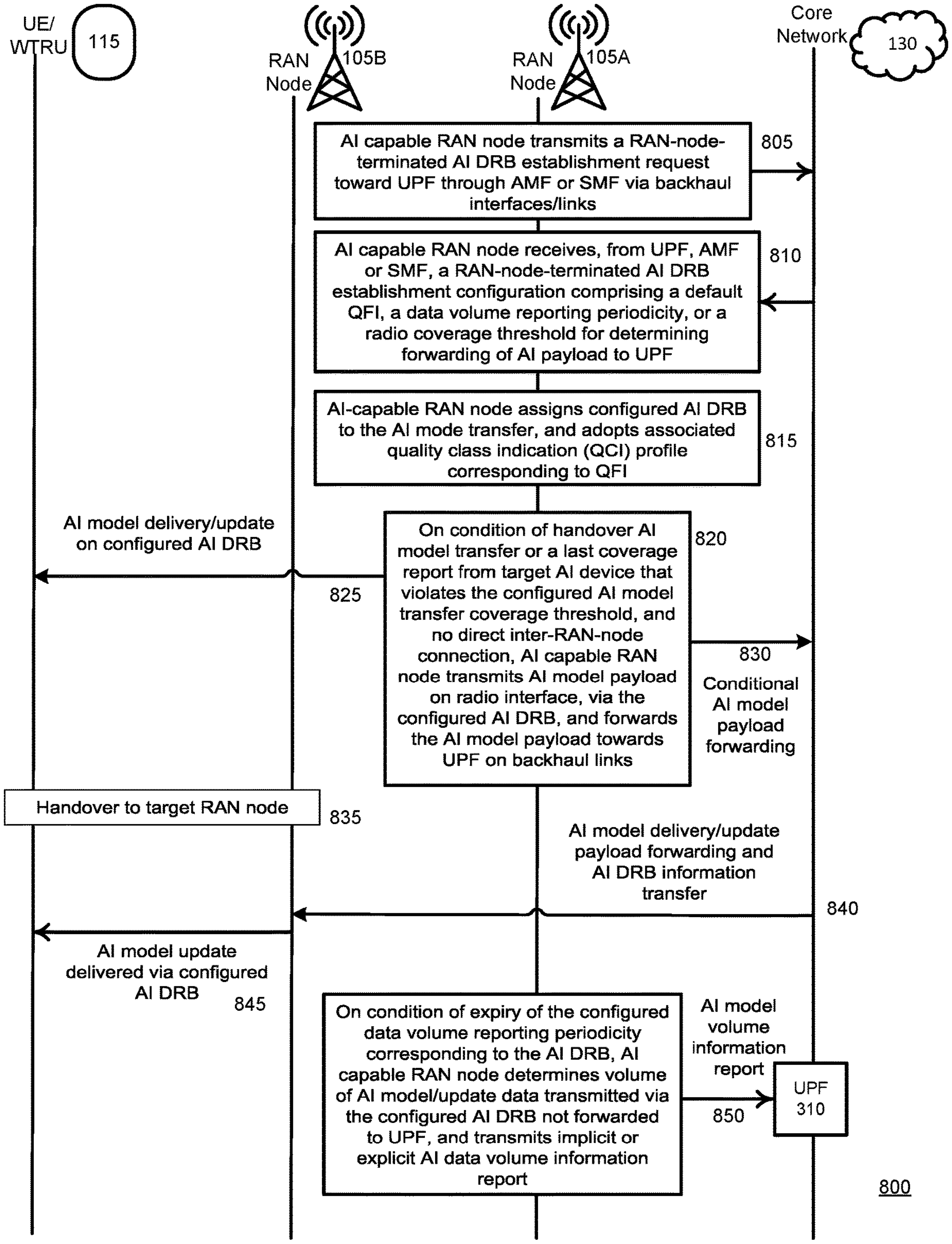
FIG. 8 illustrates a timing diagram of an example method to update, by a radio access network node, a learning model at a user equipment moving to coverage by another radio access network node.

Turning now to FIG. 8, the figure illustrates a timing diagram of an example embodiment method 800. At act 805, AI-capable RAN node 105A transmits a RAN-node-terminated AI data radio bearer (DRB) establishment request, such as request 340 described in reference to FIG. 3C, towards a user plane function UPF. Request 340 may be transmitted through an access and mobility function and/or a session management function, over backhaul interfaces N2 or N3. At act 810, AI-capable RAN 105A may receive from UPF, AMF, or SMF, a RAN-node-terminated AI DRB establishment configuration, such as configuration 345 described in reference to FIG. 3C. Configuration 345 may comprise an indication, as described in reference to FIG. 4, indicative of a default quality of service profile, an indication 415, of information and a data volume reporting periodicity for RAN 105A to generate and report to UPF 310 and/or an AMF a volume of traffic transmitted according to configuration 345, or a radio coverage criterion, such as a threshold 420, for determining if, or when, to forward AI payload data to the UPF.

Returning to description of FIG. 8, at act 815, on condition of AI/ML model information being available for transfer to UE 115, which AI/ML model information may have been generated by, or originated by, RAN node 105A, RAN node 105A may assign AI/ML-specific DRB, such as DRB 355 described in reference to FIG. 3C, to AI model transfer, and adopt a quality profile corresponding to a quality class indication (QCI) associated with the QFI received in the configuration at act 810.

At act 820, RAN 105A may determine that AI/ML model data information is available for transfer to UE 115 and that the UE may be subject to handover to another RAN 105B based on a coverage report received from the UE that indicates that, based on an analysis of a signal-strength/coverage at the UE corresponding to RAN 105A satisfying handover criterion 420, the UE is likely to be better served, either currently or in the future, by RAN 105B and thus the UE may be subject to handover during transfer of the RAN-originated AI/ML information by RAN 105A to the UE.

At act 825, RAN node 105A may transmit to UE 115 the RAN-originated AI/ML model information payload via a radio interface according to the AI DRB configured at act 815 according to configuration information received at act 810 without forwarding the AI/ML model payload to UPF 310 via backhaul links.

However, at act 830, RAN node 105A may transfer via backhaul links packets of the AI/ML model information generated by RAN 105A to UPF 310 to facilitate potential handover of UE 115 from being served by RAN 105A to being served by RAN 105B. Packets transmitted at act 830 may be packets of the AI/ML model information generated by RAN 105A that have not yet been transmitted to UE 115 via wireless/radio interface links at act 825. Thus, packets of AI/ML model information generated by RAN 105A that have already transmitted and received by UE 115 via radio interface inks may not be transmitted to UPF 310 via backhaul links but packets that have yet to be transmitted to, or received by, the UE may be transmitted to UPF 310, which may buffer the packets transmitted at act 830 until UE 115 has been handed over to RAN 105B. At act 835, RAN 105A may effectuate a handover of UE 115 such that RAN 105B begins serving the UE.

At act 840, UPF 310 may transfer DRB configuration information and packets transmitted by RAN 105A and received by the UPF at act 830 to RAN 105B, which may transmit at act 845 the packets of the AI/ML model information generated by RAN 105A that may not have been transmitted at act 825 before the handover was effectuated at act 835.

Thus, packets of AI/ML model information generated by RAN 105A may be transmitted by RAN 105A to UE 115 without passing through UPF 310 by using a special configured AI-specific DRB while the UE is connected to RAN 105A. Packets that, due to handover, are not transmitted via the configured special DRB from RAN 105A to UE 115 may be transferred via backhaul links to UPF 310 and transferred therefrom via backhaul links to RAN 105B, which may then forward, via a radio interface link, the packets to UE 115. RAN 105B may forward the packets at act 845 according to a DRB that may be established between RAN 105B and UE 115 according to the configuration information received by RAN 105A at act 810 and passed to RAN 105B from UPF 310 at act 840.

On condition of expiry of the configured data volume reporting periodicity corresponding to the AI DRB, RAN 105A may determine to transmit to UPF 310 a volume data report according to a periodicity, such as a periodicity indicated by indication 415 described in reference to FIG. 4. At act 850, RAN 105A may transmit a volume data report to UPF 310 indicating a volume of AI model information transmitted over the configured AI DRB at act 825.

Figure 9:
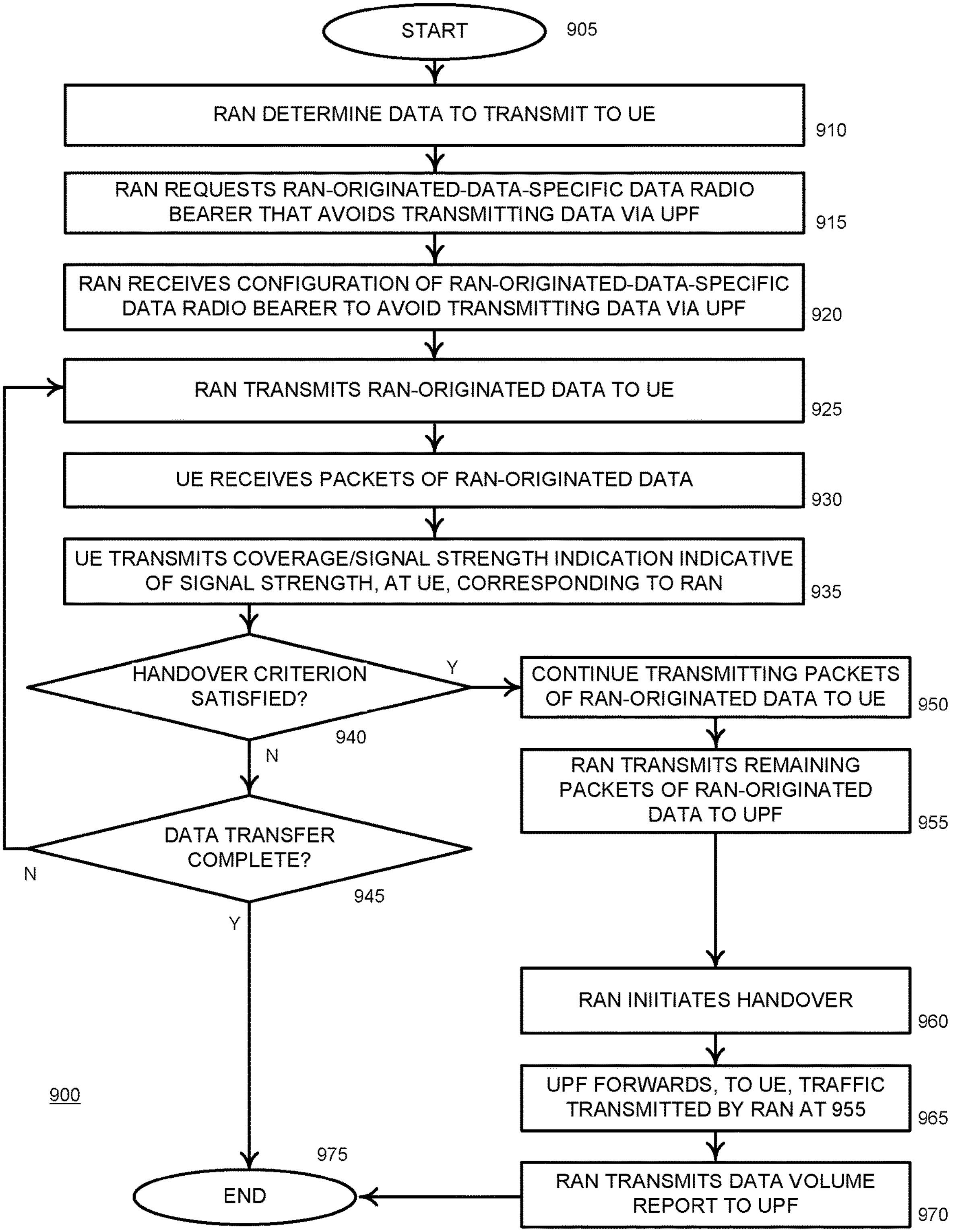
FIG. 9 illustrates a flow diagram of an example method to update an artificial intelligence learning model via a data plane resource.

Turning now to FIG. 9, the figure illustrates a flow diagram of an example method 900. Method 900 begins at act 905. At act 910, a radio access network node may determine data to be transmitted to a user equipment. For example, the radio access network node may determine an artificial intelligence machine learning model, or an update to an artificial intelligence machine learning model. The data may be data that originates at or is determined by radio access network node, other than artificial intelligence machine learning model information data.

At act 915, the radio access network node may request a special data radio bearer to be used to transmit data that originates at the radio access network node to a user equipment without the data being transmitted to a user plane function and being received back from the user plane function before the radio act says network node can transmit the data to the user equipment. The request transmitted at act 915 may be transmitted to a user plane function, an access and mobility function, or a session management function via backhaul interface links. At act 920, the radio access network node receives special data radio bearer configuration information to use to configure a special data radio bearer, to be used to transmit data that originates at the radio access network node to a user equipment, that avoids transmitting the data via a user plane function. The special data radio bearer configuration may be received from a user plane function, an access and mobility function, or a session management function via backhaul interface links. Configuration information received at act 920 may comprise a Quality-of-Service flow identifier, an AI/ML data volume reporting periodicity indication, or an AI/ML data forwarding coverage threshold.

At act 925, the radio access network node transmits data originated by the radio access network node to the user equipment. At act 930, the user equipment receives packets transmitted by the radio access network noted at 925. At act 935, the user equipment may transmit a coverage indication or a signal strength indication indicative of a signal strength of a signal received from the radio access network node by the user equipment.

At act 940, the radio access network node may determine whether a handover criterion has been satisfied. The handover criterion may be received in the configuration received at act 920. If a determination made at act 940 is that the handover criterion has not been satisfied, method 900 advances to act 945. At act 945, a determination may be made whether transfer of, or transmission of, data that originated at the radio access network node has been fully transmitted to the user equipment. If a determination made at act 945 is that the data, for example artificial intelligence machine learning model information, that originated at the radio access network node has been fully transmitted to the user equipment, method 900 advances to act 975 and ends. If a determination made at action 945 is that data that originated at the radio access node has not been fully transmitted to the user equipment, method 900 returns to act 925 and the radio access network node continues to transmit to the user equipment the data that originated at the radio access network node.

Returning to description of act 940, if a determination is made by the radio access network node that a coverage level or signal strength corresponding to the radio access network node, as determined by the user equipment, satisfies a handover criterion, for example the signal strength being below a threshold configured according to configuration information received at act 920, method 900 advances to act 950. At act 950, the radio access network node may continue transmitting packets of the data that originated at the radio access network node to the user equipment. At act 955, the radio access network node may transmit to a user plane function packets of the data determined at act 910 that have not yet been transmitted to the user equipment. At act 960, the radio access network node, which may be referred to as an original radio access network node or as a source radio access network node (e.g., the data being transmitted was originated by the original/source radio access network node), may initiate handover of the user equipment so that the user equipment connects to a different/target radio access network node that may provide a stronger signal to the user equipment than the original radio access network node and so that the different/target radio access network node can begin serving the user equipment. At act 965, the user plane function may forward to the target radio access network node data packets transmitted by the original radio access network node at act 955. Packets transmitted at act 965 may not have been transmitted by the original user equipment to the user equipment. At act 970, the original radio access network node may transmit a data volume report to the user plane function to apprise the user plane function of an amount of, or volume of, data transmitted by the original radio access network node to the user equipment that was not transmitted through the user plane function. The original radio access network node may determine to transmit the data volume report at act 970 based on a timer, or expiration of a reporting period, that may have been configured by configuration information received at act 920. Method 900 advances to act 975 and ends.

Figure 10:
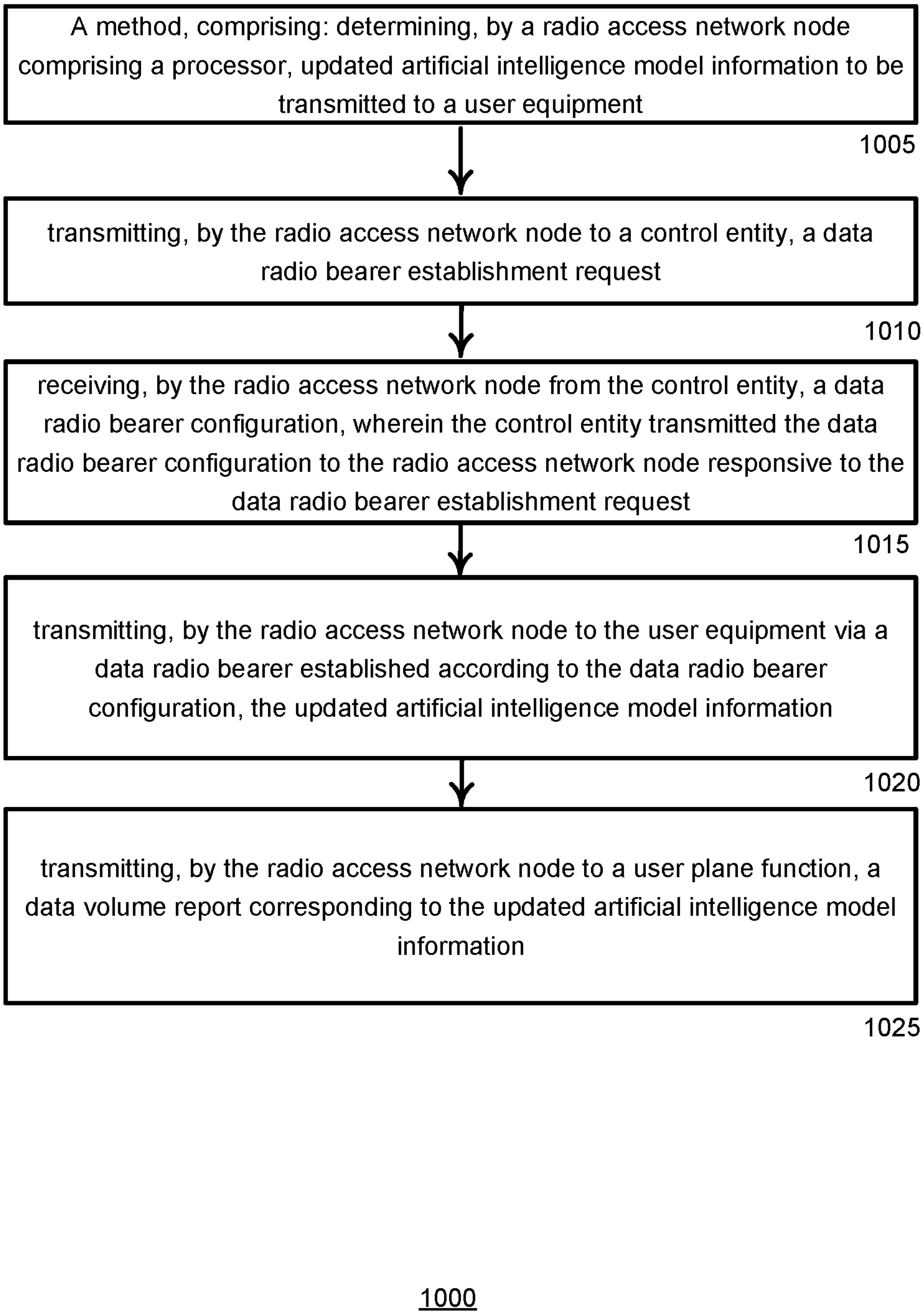
FIG. 10 illustrates a block diagram of an example method.

Turning now to FIG. 10, the figure illustrates an example embodiment method 1000 comprising at block 1005 determining, by a radio access network node comprising a processor, updated artificial intelligence model information to be transmitted to a user equipment; at block 1010 transmitting, by the radio access network node to a control entity, a data radio bearer establishment request; at block 1015 receiving, by the radio access network node from the control entity, a data radio bearer configuration, wherein the control entity transmitted the data radio bearer configuration to the radio access network node responsive to the data radio bearer establishment request; at block 1020 transmitting, by the radio access network node to the user equipment via a data radio bearer established according to the data radio bearer configuration, the updated artificial intelligence model information; and at block 1025 transmitting, by the radio access network node to a user plane function, a data volume report corresponding to the updated artificial intelligence model information.

Figure 11:
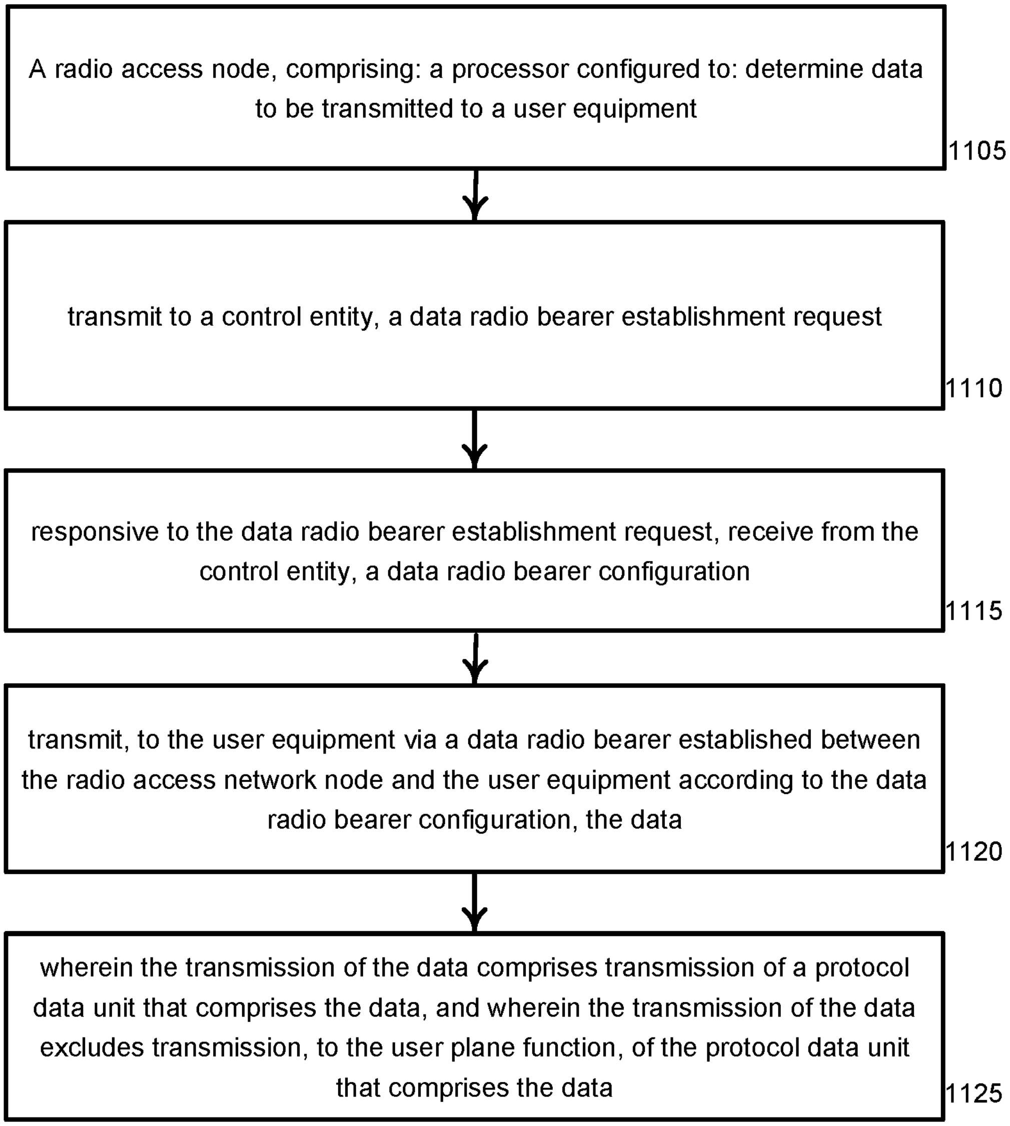
FIG. 11 illustrates a block diagram of an example radio access network node.

Turning now to FIG. 11, the figure illustrates a radio access network node 1100, comprising at block 1105 a processor configured to determine data to be transmitted to a user equipment; at block 1110 transmit to a control entity, a data radio bearer establishment request; at block 1115 responsive to the data radio bearer establishment request, receive from the control entity, a data radio bearer configuration; at block 1120 transmit, to the user equipment via a data radio bearer established between the radio access network node and the user equipment according to the data radio bearer configuration, the data; and at block 1125 wherein the transmission of the data comprises transmission of a protocol data unit that comprises the data, and wherein the transmission of the data excludes transmission, to the user plane function, of the protocol data unit that comprises the data.

Figure 12:
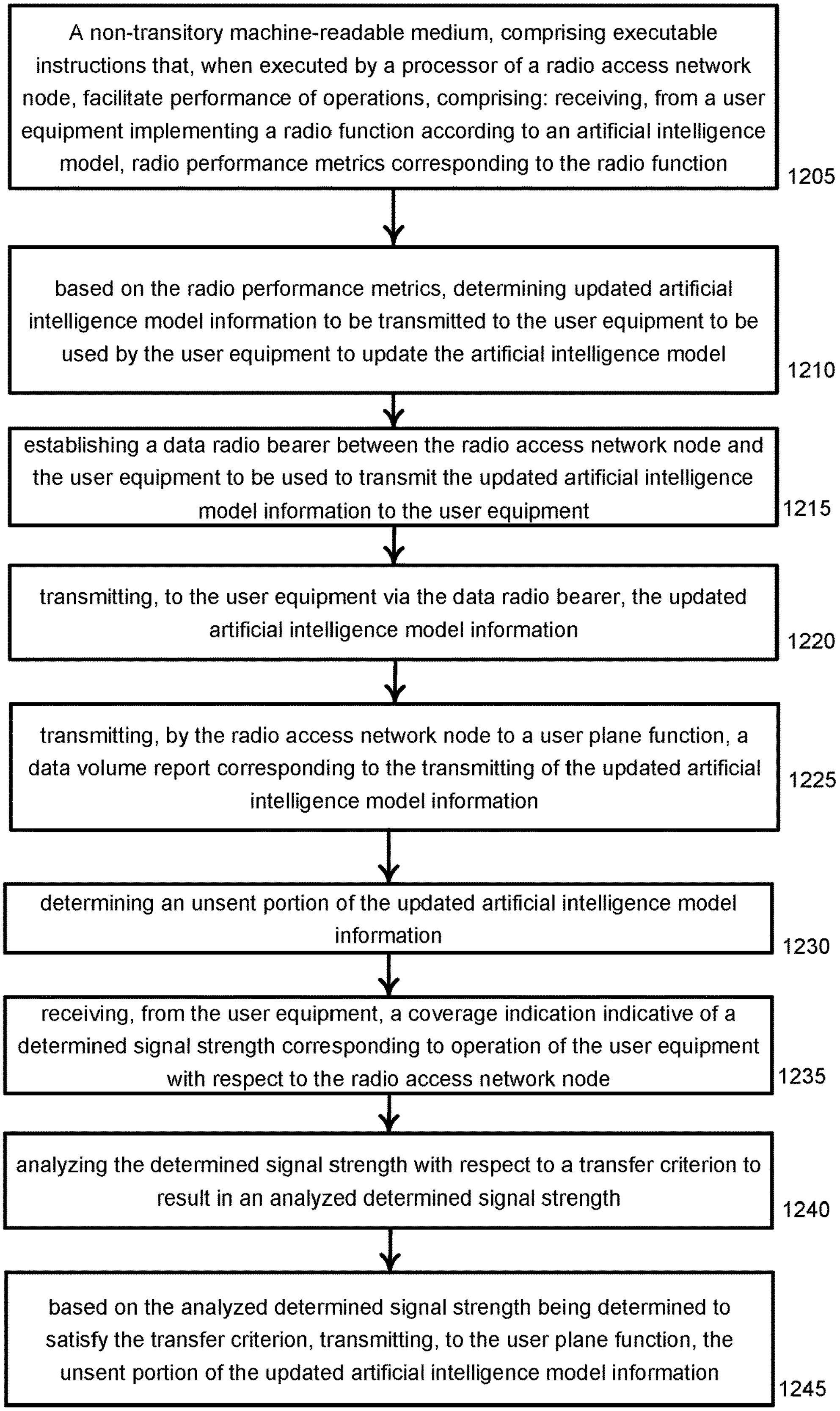
FIG. 12 illustrates a block diagram of an example non-transitory machine-readable medium.

Turning now to FIG. 12, the figure illustrates a non-transitory machine-readable medium 1200 comprising at block 1205 executable instructions that, when executed by a processor of a radio access network node, facilitate performance of operations, comprising: receiving, from a user equipment implementing a radio function according to an artificial intelligence model, radio performance metrics corresponding to the radio function; at block 1210 based on the radio performance metrics, determining updated artificial intelligence model information to be transmitted to the user equipment to be used by the user equipment to update the artificial intelligence model; at block 1215 establishing a data radio bearer between the radio access network node and the user equipment to be used to transmit the updated artificial intelligence model information to the user equipment; at block 1220 transmitting, to the user equipment via the data radio bearer, the updated artificial intelligence model information; at block 1225 transmitting, by the radio access network node to a user plane function, a data volume report corresponding to the transmitting of the updated artificial intelligence model information; at block 1230 determining an unsent portion of the updated artificial intelligence model information; at block 1235 receiving, from the user equipment, a coverage indication indicative of a determined signal strength corresponding to operation of the user equipment with respect to the radio access network node; at block 1240 analyzing the determined signal strength with respect to a transfer criterion to result in an analyzed determined signal strength; and at block 1245 based on the analyzed determined signal strength being determined to satisfy the transfer criterion, transmitting, to the user plane function, the unsent portion of the updated artificial intelligence model information.

Figure 13:
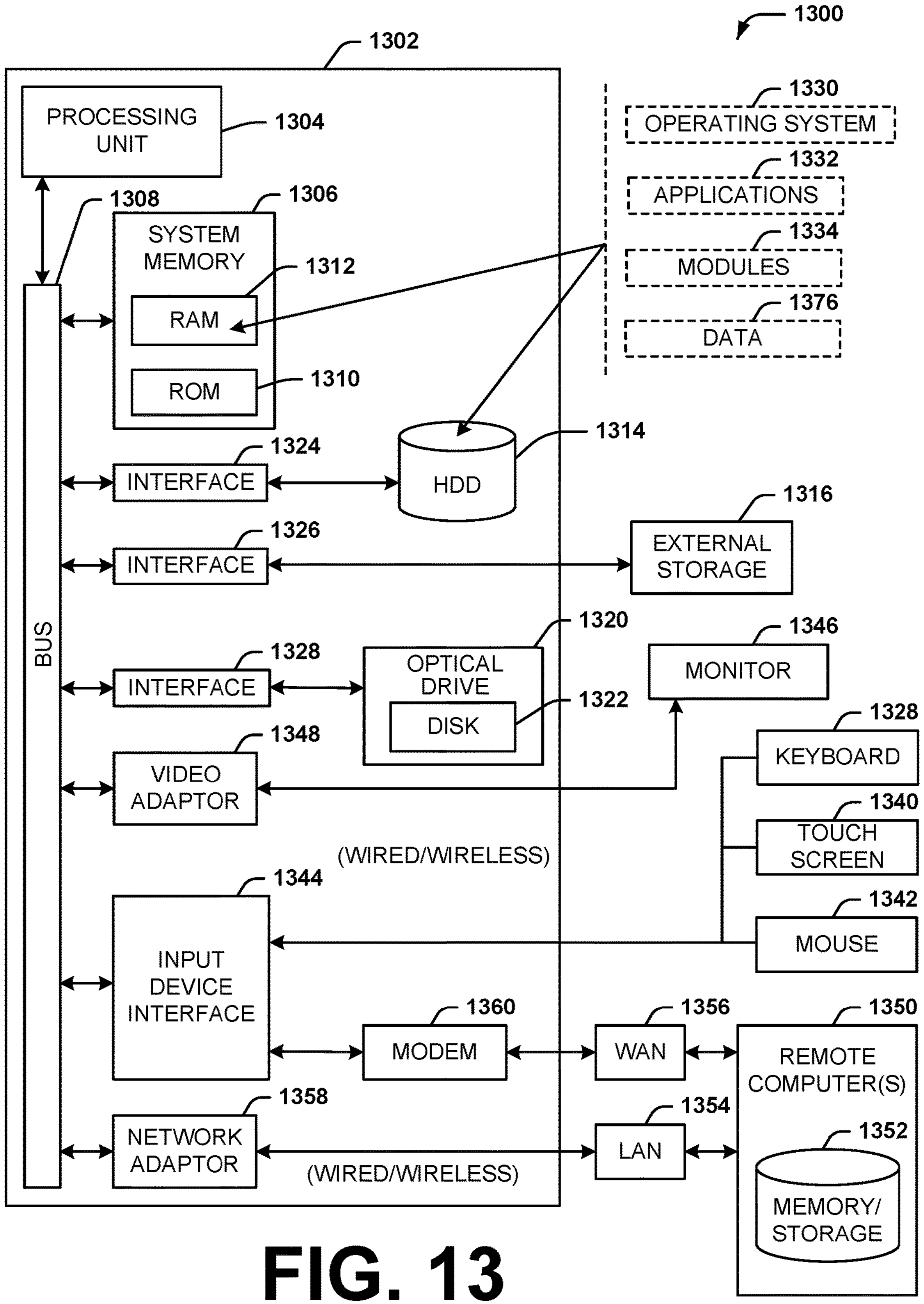
FIG. 13 illustrates an example computer environment.

In order to provide additional context for various embodiments described herein, FIG. 13 and the following discussion are intended to provide a brief, general description of a suitable computing environment 1300 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors and may include a cache memory. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

Computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid-state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can comprise a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
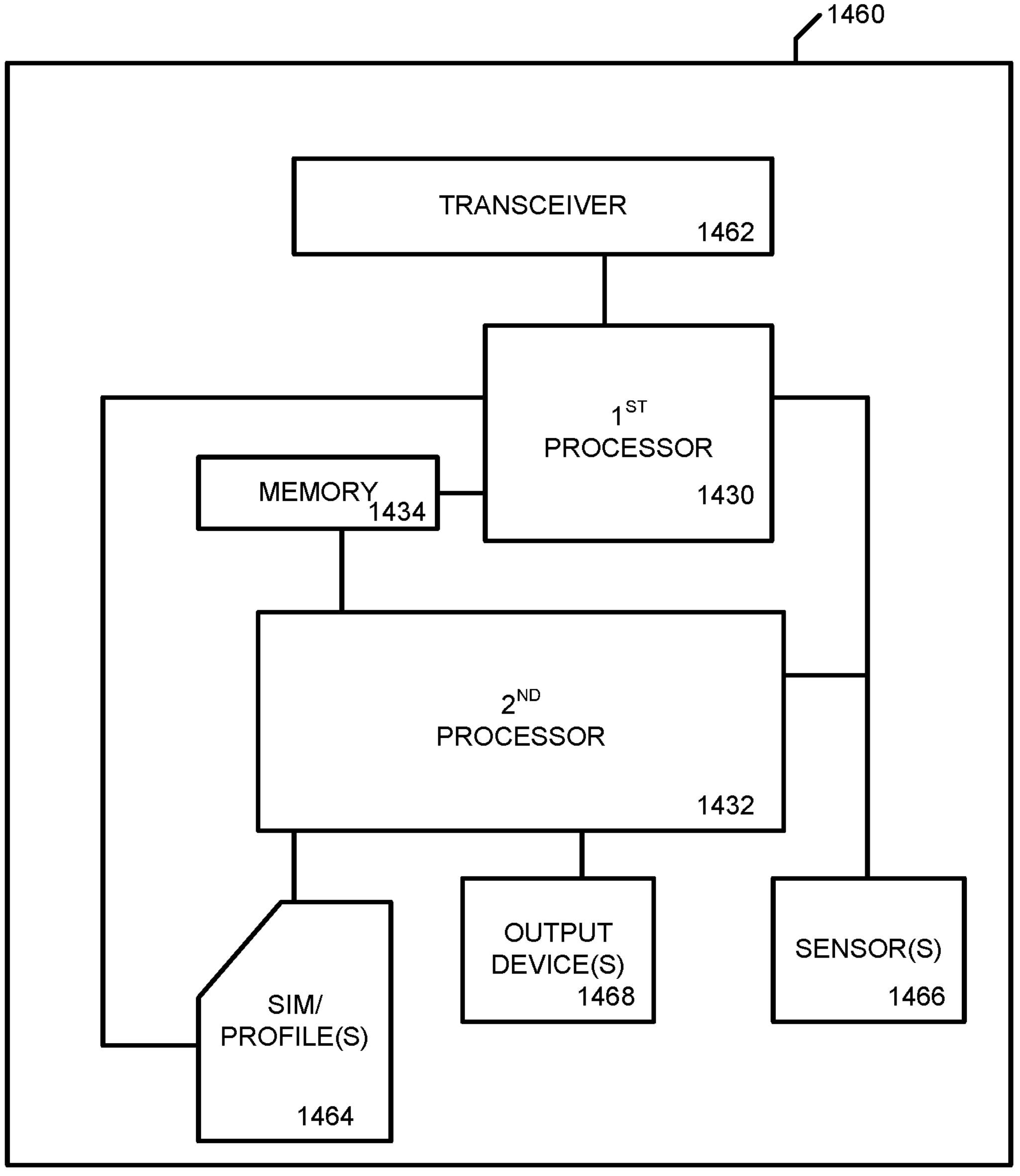
FIG. 14 illustrates a block diagram of an example wireless UE.

Turning to FIG. 14, the figure illustrates a block diagram of an example UE 1460. UE 1460 may comprise a smart phone, a wireless tablet, a laptop computer with wireless capability, a wearable device, a machine device that may facilitate vehicle telematics, a tracking device, remote sensing devices, and the like. UE 1460 comprises a first processor 1430, a second processor 1432, and a shared memory 1434. UE 1460 includes radio front end circuitry 1462, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1462 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 14, UE 1460 may also include a SIM 1464, or a SIM profile, which may comprise information stored in a memory (memory 1434 or a separate memory portion), for facilitating wireless communication with RAN 105 or core network 130 shown in FIG. 1. FIG. 14 shows SIM 1464 as a single component in the shape of a conventional SIM card, but it will be appreciated that SIM 1464 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1464 and another device, which may be a component of RAN 105 or core network 130 shown in FIG. 1). A SIM profile 1464 may also comprise identifying information that is unique to the SIM, or SIM profile, such as, for example, an International Mobile Subscriber Identity ("IMSI") or information that may make up an IMSI.

SIM 1464 is shown coupled to both the first processor portion 1430 and the second processor portion 1432. Such an implementation may provide an advantage that first processor portion 1430 may not need to request or receive information or data from SIM 1464 that second processor 1432 may request, thus eliminating the use of the first processor acting as a 'go-between' when the second processor uses information from the SIM in performing its functions and in executing applications. First processor 1430, which may be a modem processor or a baseband processor, is shown smaller than processor 1432, which may be a more sophisticated application processor, to visually indicate the relative levels of sophistication (i.e., processing capability and performance) and corresponding relative levels of operating power consumption levels between the two processor portions. Keeping the second processor portion 1432 asleep/inactive/in a low power state when UE 1460 does not need it for executing applications and processing data related to an application provides an advantage of reducing power consumption when the UE only needs to use the first processor portion 1430 while in listening mode for monitoring routine configured bearer management and mobility management/maintenance procedures, or for monitoring search spaces that the UE has been configured to monitor while the second processor portion remains inactive/asleep.

UE 1460 may also include sensors 1466, such as, for example, temperature sensors, accelerometers, gyroscopes, barometers, moisture sensors, and the like that may provide signals to the first processor 1430 or second processor 1432. Output devices 1468 may comprise, for example, one or more visual displays (e.g., computer monitors, VR appliances, and the like), acoustic transducers, such as speakers or microphones, vibration components, and the like. Output devices 1468 may comprise software that interfaces with output devices, for example, visual displays, speakers, microphones, touch sensation devices, smell or taste devices, and the like, that are external to UE 1460.

The following glossary of terms given in Table 2 may apply to one or more descriptions of embodiments disclosed herein.

TABLE 2

| Term | Definition |
|---|---|
| UE | User equipment |
| WTRU | Wireless transmit receive unit |
| RAN | Radio access network |
| QoS | Quality of service |
| DRX | Discontinuous reception |

TABLE 2-continued

| Term | Definition |
|---|---|
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising: determining, by a radio access network node comprising at least one processor, updated artificial intelligence model information to be transmitted to a user equipment; transmitting, by the radio access network node to a control entity, a data radio bearer establishment request; receiving, by the radio access network node from the control entity, a data radio bearer configuration, wherein the control entity transmitted the data radio bearer configuration to the radio access network node responsive to the data radio bearer establishment request; transmitting, by the radio access network node to the user equipment via a data radio bearer established according to the data radio bearer configuration, the updated artificial intelligence model information; and transmitting, by the radio access network node to a user plane function, a data volume report corresponding to the updated artificial intelligence model information wherein the transmitting of the updated artificial intelligence model information comprises transmitting at least one protocol data unit that comprises the updated artificial intelligence model information, and wherein the transmitting of the updated artificial intelligence model information excludes transmitting, to the user plane function, the at least one protocol data unit that comprises the updated artificial intelligence model information.

2. The method of claim 1, wherein the data radio bearer configuration comprises at least one of: a quality-of-service indication indicative of a quality-of-service corresponding to the updated artificial intelligence model information, a data volume reporting periodicity indication indicative of a reporting periodicity according to which the radio access network node is to transmit the data volume report, or a data forwarding coverage transfer criterion to be used in determining, by the radio access network node, that the transmitting the updated artificial intelligence model information is to be transferred to another radio access network node other than the radio access network node.

3. The method of claim 1, wherein the data volume report comprises at least one of: a data radio bearer identifier corresponding to the data radio bearer; or one or more user equipment identifiers corresponding to one or more user equipment, comprising the user equipment, to which the radio access network node transmitted the updated artificial intelligence model information.

4. The method of claim 1, wherein the data radio bearer is established between the radio access network node and the user equipment.

5. The method of claim 1, wherein the control entity or the user plane function are implemented by a computing component of a core network communicatively coupled to the radio access network node.

6. The method of claim 1, wherein the transmitting of the updated artificial intelligence model information is via a wireless link between the radio access network node and the user equipment.

7. The method of claim 1, wherein the data volume report comprises a volume indication indicative of a number of units of the at least one protocol data unit that comprises the updated artificial intelligence model information.

8. The method of claim 1, wherein the data volume report comprises a volume indication indicative of a size of the at least one protocol data unit that comprises the updated artificial intelligence model information.

9. The method of claim 1, further comprising: transmitting, by the radio access network node to the user equipment, a coverage request comprising a request for a signal strength corresponding to the radio access network node at the user equipment; receiving, by the radio access network node from the user equipment, a coverage indication indicative of a determined signal strength, corresponding to the radio access network node, determined by the user equipment; analyzing, by the radio access network node, the determined signal strength with respect to a transfer criterion to result in an analyzed determined signal strength, determining, by the radio access network node, a portion of the updated artificial intelligence model information that has not been transmitted to the user equipment to result in a determined unsent portion; and based on the analyzed determined signal strength being determined to satisfy the transfer criterion, transmitting, by the radio access network node to the user plane function, the determined unsent portion.

10. The method of claim 9, wherein the determined unsent portion is transmitted by the radio access network node to the user plane function via a backhaul communication link.

11. The method of claim 9, further comprising: determining, by the radio access network node, a portion of the updated artificial intelligence model information that has been transmitted to the user equipment by the radio access network node to result in a determined sent portion, wherein the data volume report comprises a volume indication indicative of a number of at least one protocol data unit that comprises the determined sent portion.

12. The method of claim 9, further comprising: determining, by the radio access network node, a portion of the updated artificial intelligence model information that has been transmitted to the user equipment by the radio access network node to result in a determined sent portion, wherein the data volume report comprises a volume indication indicative of one or more protocol data units that comprise the updated artificial intelligence model information.

13. A radio access node, comprising: at least one processor configured to: determine data to be transmitted to a user equipment; transmit to a control entity, a data radio bearer establishment request; responsive to the data radio bearer establishment request, receive from the control entity, a data radio bearer configuration; and transmit, to the user equipment via a data radio bearer established between the radio access network node and the user equipment according to the data radio bearer configuration, the data, wherein the transmission of the data comprises transmission of a protocol data unit that comprises the data, and wherein the transmission of the data excludes transmission, to the user plane function, of the protocol data unit that comprises the data.

14. The radio access network node of claim 13, wherein the data radio bearer configuration comprises a reporting periodicity indication indicative of a frequency at which the radio access node is to transmit to a user plane function a data volume report corresponding to transmission, by the radio access network node to the user equipment, of the data, and the method further comprising: transmitting, by the radio access network node to the user plane function according to the reporting periodicity indication, a data volume report corresponding to the transmission of the data by the radio access network node to the user equipment.

15. The radio access network node of claim 13, wherein the at least one processor is further configured to: receive, from the user equipment, a coverage indication indicative of a determined signal strength corresponding to the radio access network node; analyze the determined signal strength with respect to a transfer criterion to result in an analyzed determined signal strength; determine a portion of the data that has not been transmitted to the user equipment to result in a determined unsent data portion; and based on the analyzed determined signal strength being determined to satisfy the transfer criterion, transmit, by the radio access network node to the user plane function, the determined unsent data portion.

16. The radio access network node of claim 13, wherein the control entity comprises at least one of: a session management function, or an access and mobility function.

17. A non-transitory machine-readable medium, comprising executable instructions that, when executed by at least one processor of a radio access network node, facilitate performance of operations, comprising: receiving, from a user equipment implementing a radio function according to an artificial intelligence model, radio performance metrics corresponding to the radio function; based on the radio performance metrics, determining updated artificial intelligence model information to be transmitted to the user equipment to be used by the user equipment to update the artificial intelligence model; establishing a data radio bearer between the radio access network node and the user equipment to be used to transmit the updated artificial intelligence model information to the user equipment; transmitting, to the user equipment via the data radio bearer, the updated artificial intelligence model information; transmitting, by the radio access network node to a user plane function, a data volume report corresponding to the transmitting of the updated artificial intelligence model information; determining an unsent portion of the updated artificial intelligence model information; receiving, from the user equipment, a coverage indication indicative of a determined signal strength corresponding to operation of the user equipment with respect to the radio access network node; analyzing the determined signal strength with respect to a transfer criterion to result in an analyzed determined signal strength; and based on the analyzed determined signal strength being determined to satisfy the transfer criterion, transmitting, to the user plane function, the unsent portion of the updated artificial intelligence model information.

18. The method of claim 1, wherein the data volume report is usable to determine billing with respect to the transmitting of the at least one protocol data unit to the user equipment.

19. The radio access node of claim 13, wherein the data volume report is usable to determine billing with respect to the transmitting of the data to the user equipment.

20. The non-transitory machine-readable medium of claim 17, wherein the data volume report is usable to determine billing with respect to the transmitting, to the user equipment by the radio access network node via the data radio bearer, the updated artificial intelligence model information.

* * * * *